United States Patent
Wang et al.

(10) Patent No.: US 12,375,359 B2
(45) Date of Patent: Jul. 29, 2025

(54) DETERMINATION OF PATH ARRANGEMENT OF INFRASTRUCTURE LINK NETWORK WITH TRUNK-AND-BRANCH TOPOLOGY

(71) Applicant: City University of Hong Kong, Kowloon (HK)

(72) Inventors: Tianjiao Wang, Shandong (CN); Bill Moran, Vic (AU); Zengfu Wang, Shanxi (CN); Moshe Zukerman, Kowloon (HK); Xinyu Wang, Shanxi (CN); Chao Guo, Kowloon (HK)

(73) Assignee: City University of Hong Kong, Kowloon (HK)

( * ) Notice: Subject to any disclaimer, the term of this patent is extended or adjusted under 35 U.S.C. 154(b) by 569 days.

(21) Appl. No.: 17/829,655

(22) Filed: Jun. 1, 2022

(65) Prior Publication Data
US 2023/0396506 A1   Dec. 7, 2023

(51) Int. Cl.
*H04L 41/14*   (2022.01)
*H04L 41/0826*   (2022.01)

(52) U.S. Cl.
CPC ........ *H04L 41/145* (2013.01); *H04L 41/0826* (2013.01)

(58) Field of Classification Search
CPC ............................ H04L 41/145; H04L 41/0826
See application file for complete search history.

(56) References Cited

U.S. PATENT DOCUMENTS

2019/0116090 A1* 4/2019 Zukerman ............. H04L 41/145
2020/0252327 A1* 8/2020 Zukerman ............. H04L 45/126

OTHER PUBLICATIONS

H. Everett III, "Generalized Lagrange multiplier method for solving problems of optimum allocation of resources", Operations Research, vol. 11, No. 3, pp. 399-417, 1963.
Y. Nesterov, "Primal-dual subgradient methods for convex problems," Mathematical Programming, vol. 120, No. 1, pp. 221-259, 2009.
D. Zhao, "Semicontinuous lattices," Algebra Universalis, vol. 37, No. 4, pp. 458-476, 1997.

(Continued)

*Primary Examiner* — Duc C Ho
(74) *Attorney, Agent, or Firm* — Renner, Kenner, Greive, Bobak, Taylor & Weber

(57) ABSTRACT

A computer-implemented method for determining a path arrangement of an infrastructure link network with a trunk-and-branch topology. The method includes: modelling a geographic terrain including three or more geographic locations that are connectable with each other via an infrastructure link network; determining a cost function associated with a cost for constructing the infrastructure link network that connects the three or more geographic locations; and determining a path arrangement of the infrastructure link network based on the modelled geographic terrain and by optimizing the cost function taking into account one or more constraints. The path arrangement of the infrastructure link network has a trunk-and-branch topology and includes: three or more infrastructure links that connect the three or more geographic locations, and one or more connection points each arranged between two or more of the infrastructure links.

24 Claims, 23 Drawing Sheets

(56) References Cited

OTHER PUBLICATIONS

"Global Multi-Resolution Topography Data Synthesis," Oct. 2019. [Online]. Available: https://www.gmrt.org/.
Y. Nourani and B. Andresen, "A comparison of simulated annealing cooling strategies," Journal of Physics A: Mathematical and General, vol. 31, No. 41, p. 8373, 1998.
B. Hajek, "Optimization by Simulated Annealing: A Necessary and Sufficient Condition for Convergence," Lecture Notes-Monograph Series, vol. 8, pp. 417-427, 1986. [Online]. Available: http://www.jstor.org/stable/4355548.
R. Holley and D. Stroock "Simulated annealing via Sobolev inequalities," Communications in Mathematical Physics, vol. 115, No. 4, pp. 553-569, 1988.
P. Crescenzi and V. Kann, "Approximation on the web: A compendium of NP optimization problems", in Randomization and Approximation Techniques in Computer Science, J. Rolim, Ed. Berlin, Heidelberg: Springer Berlin Heidelberg, 1997, pp. 111-118.
J. Haddock and J. Mittenthal, "Simulation optimization using simulated annealing", Computers & Industrial Engineering, vol. 22, No. 4, pp. 387-395, 1992.
R. Ramaswami and K. N. Sivarajan, "Routing and wave-length assignment in all-optical networks", IEEE/ACM Transactions on networking, vol. 3, No. 5, pp. 489-500, 1995.
S. E. Dreyfus and R. A. Wagner, "The Steiner problem in graphs", Networks, vol. 1, No. 3, pp. 195-207, 1971.
L. Carter, Submarine cables and the oceans: connecting the world. UNEP/Earthprint, 2010, No. 31.
C. D. Aliprantis and K. C. Border, Infinite Dimensional Analysis. Springer, 2006.

\* cited by examiner

DETERMINATION OF PATH ARRANGEMENT OF INFRASTRUCTURE LINK NETWORK WITH TRUNK-AND-BRANCH TOPOLOGY

TECHNICAL FIELD

The invention relates to the determination of path arrangement of infrastructure link network with trunk-and-branch topology. As a non-limiting example, the infrastructure link network comprises a submarine communication cable network.

BACKGROUND

Infrastructure link network is a network of infrastructure link that typically includes link-like physical structures such as cables, pipes, roads, etc.

One exemplary infrastructure link network is submarine communication cable network. Submarine communication cable networks are important communications-technology infrastructures for enabling data and information transfer between/among different locations, areas, regions, countries, etc. As internet traffic increases, the demand on communication cable networks also increases.

There is a need to suitably, efficiently, and/or reliably design the path of infrastructure link networks, such as submarine communication cable networks (e.g., the path arrangement of the communication cables), to facilitate cost-effective construction or modification of these networks.

SUMMARY OF THE INVENTION

In a first aspect of the invention, there is provided a computer-implemented method for determining a path arrangement of an infrastructure link network with a trunk-and-branch topology. The method comprises: modelling a geographic terrain including three or more geographic locations that are connectable with each other, directly or indirectly, via an infrastructure link network; determining a cost function associated with a cost for constructing the infrastructure link network that connects the three or more geographic locations; and determining a path arrangement of the infrastructure link network based on the modelled geographic terrain and by optimizing the cost function taking into account one or more constraints. The path arrangement of the infrastructure link network has a trunk-and-branch topology and includes: three or more infrastructure links that connect the three or more geographic locations, and one or more connection points each arranged between two or more of the infrastructure links.

Optionally, optimizing the cost function taking into account one or more constraints comprises minimizing the cost function taking into account one or more constraints.

Optionally, the modelling of the geographic terrain comprises modelling the geographic terrain as an irregular two-dimensional (2D) manifold in three-dimensional (3D) Euclidean space. In some embodiments, the irregular 2D manifold in 3D Euclidean space comprises a triangulated piecewise-linear 2D manifold in 3D Euclidean space. In some embodiments, the 2D manifold comprises multiple nodes each representable or represented by a 3D coordinate (position x, y and altitude z).

Optionally, the cost function is a location dependent cost function.

Optionally, the cost function is a depth dependent cost function.

Optionally, the cost function comprises one or more cost factors that may be respectively weighted.

Optionally, the cost for constructing the infrastructure link network comprises costs associated with laying and/or constructing (i) the infrastructure links and (ii) one or more connector units each connecting two or more of the infrastructure links, each of the one or more connector units is to be arranged or is arranged at a respective one of the one or more connection points.

Optionally, the one or more constraints comprise a maximum path length between two of the geographic locations, the maximum path length being defined by one or more of the infrastructure links between the two of the geographic locations.

Optionally, the determining of the path arrangement of the infrastructure link network comprises determining a total number of and/or respective positions of the one or more connection points.

Optionally, the determination of the path arrangement of the infrastructure link network comprises: formulating the determination of the path arrangement of the infrastructure link network as a Steiner Minimal Tree problem taking into account the one or more constraints; and solving the Steiner Minimal Tree problem taking into account the one or more constraints; the trunk-and-branch topology of the path arrangement of the infrastructure link network generally corresponds to a Steiner topology (e.g., a full Steiner topology or a degenerate Steiner topology).

Optionally, the formulating comprises formulating the Steiner Minimal Tree problem as a constrained Steiner Minimal Tree problem that can be represented by:

$$\min_{S \in H, \Gamma} F(S) = f(S) + c_b \cdot N_b$$

$$\text{s.t. } d_k(x_i, x_j) \le b_k(x_i, x_j),$$

$$k = 1, \ldots, |R|$$

where H is a set of mesh points in the modelled geographic terrain; $\Gamma$ is a set of geodesic curves of the Steiner tree; R is a set of one or more constraints; $s = \{s_1, s_2, \ldots s_{N_b}\}$ is a set of positions of one or more Steiner nodes in the modelled geographic terrain; f(S) is an infrastructure link laying cost of the infrastructure link network, which is dependent on the positions of the one or more Steiner nodes S and the geodesic curves $\Gamma$; $N_b$ is the number of Steiner nodes; $c_b$ is the cost of each connector unit; $x_i$ and $x_j$ are any pair(s) of terminal nodes subjected to constrain factor(s), each of the terminal nodes corresponding to a respective one of the geographic locations; $b(x_i, x_j)$ is a value of the constraint; and $d_k(x_i, x_j)$ is a path length defined by one or more infrastructure links between nodes $x_i$ and $x_j$.

Optionally, the solving comprises: converting the constrained Steiner Minimal Tree problem into an unconstrained problem based on a Lagrange multiplier based method; and determining a solution for the unconstrained problem to obtain respective optimal position of one or more Steiner nodes, each of the one or more Steiner nodes corresponding to a respective one of the one or more connection points.

Optionally, the Lagrange multiplier based method applies a Lagrangian function that can be represented as:

$$L(S, \lambda) = f(S) + \sum_{k=1}^{|R|} \lambda_k (g_k(S) - b_k(x_i, x_j)) + c_b \cdot N_b,$$

where L(S·A) is a Lagrangian function of s and $\lambda$; $\lambda = [\lambda_1, \lambda_2, \ldots, \lambda_{|R|}]^T$ is the vector of Lagrange multipliers, $\lambda_k \geq 0$; f(S) represents the infrastructure link laying cost of the infrastructure link network; $g_k(S)$ denotes (k; which is determined by the position of Steiner node(s) on a path of one or more infrastructure links between constrained nodes $x_i$ and $x_j$.

Optionally, the determining of the solution comprises: applying fast marching method to each of the terminal nodes to obtain corresponding distance maps; and processing the distance maps and a predetermined Steiner tree topology based on a directed acyclic graph based dynamic programming algorithm to obtain respective coordinate of the one or more Steiner nodes. These one or more Steiner nodes may be intermediate Steiner node(s) to be further optimized or may be optimized Steiner node(s).

Optionally, the one or more constraints consist of a single constraint associated with a maximum path length between two of the geographic locations, the maximum path length being defined by one or more of the infrastructure links between the two of the geographic locations.

Optionally, the determining of the solution further comprises: updating the distance maps based on a value of $\lambda$ associated with the single constraint; and processing the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s).

Optionally, the determining of the solution further comprises: (1) updating the value of $\lambda$ based on a primal-dual subgradient method; (2) updating the distance maps based on the updated value of $\lambda$; and (3) processing the updated distance maps and the predetermined Steiner tree topology based on the directed acyclic graph based dynamic programming algorithm to obtain updated coordinates of one or more Steiner nodes. These one or more Steiner nodes may be intermediate Steiner node(s) to be further optimized or may be optimized Steiner node(s).

Optionally, the determining of the solution further comprises: iteratively repeating steps (1) to (3) until or after a predetermined condition is met.

Optionally, the determining of the solution further comprises: iteratively repeating steps (1) to (3) until or after a limit of the constraint is reached, until or after a threshold associated with a limit of the constraint is reached, or until or after a predetermined number of iterations is completed, so as to obtain respective optimal position of the one or more Steiner nodes.

Optionally, the one or more constraints comprise a plurality of constraints associated with a corresponding plurality of maximum path lengths each between respective two of the geographic locations, each of the maximum path lengths being defined by one or more of the infrastructure links between the two of the geographic locations.

Optionally, the determining of the solution further comprises: updating the distance maps based on values of two or more $\lambda$s each associated with a respective one of the constrains; and processing the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s).

Optionally, the determining of the solution further comprises: (1) updating all of the values of $\lambda$s based on a primal-dual subgradient method; (2) updating the distance maps based on the updated values of $\lambda$s; and (3) processing the updated distance maps and the predetermined Steiner tree topology based on the directed acyclic graph based dynamic programming algorithm to obtain updated coordinates of one or more Steiner nodes. These one or more Steiner nodes may be intermediate Steiner node(s) to be further optimized or may be optimized Steiner node(s).

Optionally, the determining of the solution further comprises: iteratively repeating steps (1) to (3) until or after a predetermined condition is met.

Optionally, the determining of the solution further comprises: iteratively repeating steps (1) to (3) until or after respective limits of one or more of the constraints is reached, until or after respective thresholds associated with respective limits of one or more of the constraints is reached, or until or after a predetermined number of iterations is completed, so as to obtain respective optimal position of the one or more Steiner nodes.

In some embodiments, the infrastructure link network comprises a submarine communication cable network. Optionally, the cost for constructing the submarine communication cable network comprises cost associated with laying and/or constructing (i) the communications cables and (ii) one or more branching units for connecting with at least two of the communications cables, each of the one or more branching units is arranged at a respective one of the one or more connection points. In some embodiments, the cost associated with laying and constructing the communications cables and the one or more branching units includes, at least, cable cost, cable laying cost (e.g., cost associated with labour, materials, permits), and branching unit cost. In some embodiments, the one or more constraints comprise a maximum communication cable path length between two of the geographic locations. The maximum communication cable path length is defined by one or more of the communications cables, and is associated with maximum permissible latency between the two of the geographic locations.

In some embodiments, the infrastructure link network comprises a pipeline network. Optionally, the cost for constructing the pipeline network comprises cost associated with laying and constructing (i) the pipes and (ii) one or more manifolds for connecting with at least two of the pipes, each of the one or more manifolds is arranged at a respective one of the one or more connection points.

In some embodiments, the infrastructure link network comprises a road network. Optionally, the cost for constructing the pipeline network comprises cost associated with laying and constructing (i) the roads and (ii) one or more junctions for connecting with at least two of the roads, each of the one or more junctions is arranged at a respective one of the one or more connection points.

Optionally, the computer-implemented further comprises: displaying the determined path arrangement of the infrastructure link network overlaid on a model of the geographic terrain.

In a second aspect, there is provided a non-transitory computer readable medium comprising computer instructions which, when executed by a computer (or one or more processors), cause the computer (or one or more processors) to carry out the method of the first aspect.

In a third aspect, there is provided a data processing system comprising means for carrying out the method of the first aspect.

In a fourth aspect, there is provided a computer program comprising instructions, which, when the computer program is executed by a computer (or one or more processors), cause the computer (or one or more processors) to carry out the method of the first aspect.

In a fifth aspect, there is provided a system for determining a path arrangement of an infrastructure link network with a trunk-and-branch topology. The system comprises one or more processors arranged to: model a geographic terrain including three or more geographic locations that are connectable with each other, directly or indirectly, via an infrastructure link network; determine a cost function associated with a cost for constructing the infrastructure link network that connects the three or more geographic locations; and determine a path arrangement of the infrastructure link network based on the modelled geographic terrain and by optimizing the cost function taking into account one or more constraints. The path arrangement of the infrastructure link network has a trunk-and-branch topology and includes: three or more infrastructure links that connect the three or more geographic locations, and one or more connection points each arranged between two or more of the infrastructure links.

Optionally, the one or more processors are arranged to minimize the cost function taking into account the one or more constraints.

Optionally, the one or more processors are arranged to model the geographic terrain as an irregular two-dimensional (2D) manifold in three-dimensional (3D) Euclidean space. In some embodiments, the irregular 2D manifold in 3D Euclidean space comprises a triangulated piecewise-linear 2D manifold in 3D Euclidean space. In some embodiments, the 2D manifold comprises multiple nodes each representable or represented by a 3D coordinate (position x, y and altitude z).

Optionally, the cost function is a location dependent cost function.

Optionally, the cost function is a depth dependent cost function.

Optionally, the cost function comprises one or more cost factors that may be respectively weighted.

Optionally, the cost for constructing the infrastructure link network comprises costs associated with laying and/or constructing (i) the infrastructure links and (ii) one or more connector units each connecting two or more of the infrastructure links, each of the one or more connector units is to be arranged or is arranged at a respective one of the one or more connection points.

Optionally, the one or more constraints comprise a maximum path length between two of the geographic locations, the maximum path length being defined by one or more of the infrastructure links between the two of the geographic locations.

Optionally, the one or more processors are arranged to determine a total number of and/or respective positions of the one or more connection points.

Optionally, the one or more processors are arranged to: formulate the determination of the path arrangement of the infrastructure link network as a Steiner Minimal Tree problem taking into account the one or more constraints; and solve the Steiner Minimal Tree problem taking into account the one or more constraints; the trunk-and-branch topology of the path arrangement of the infrastructure link network generally corresponds to a Steiner topology (e.g., a full Steiner topology or a degenerate Steiner topology).

Optionally, the one or more processors are arranged to formulate the Steiner Minimal Tree problem as a constrained Steiner Minimal Tree problem that can be represented by:

$$\min_{S \in H, \Gamma} F(S) = f(S) + c_b \cdot N_b$$

$$\text{s.t. } d_k(x_i, x_j) \le b_k(x_i, x_j),$$

$$k = 1, \ldots, |R|$$

where H is a set of mesh points in the modelled geographic terrain; Γ is a set of geodesic curves of the Steiner tree; R is a set of one or more constraints; $S = \{s_1, s_2, \ldots, s_{N_b}\}$ is a set of positions of one or more Steiner nodes in the modelled geographic terrain; f(S) is an infrastructure link laying cost of the infrastructure link network, which is dependent on the positions of the one or more Steiner nodes S and the geodesic curves Γ; $N_b$ is the number of Steiner nodes; $c_b$ is the cost of each connector unit; $x_i$ and $x_j$ are any pair(s) of terminal nodes subjected to constrain factor(s), each of the terminal nodes corresponding to a respective one of the geographic locations; $b(x_i, x_j)$ is a value of the constraint; and $d_k(x_i, x_j)$ is a path length defined by one or more infrastructure links between nodes $x_i$ and $x_j$.

Optionally, the one or more processors are arranged to: convert the constrained Steiner Minimal Tree problem into an unconstrained problem based on a Lagrange multiplier based method; and determine a solution for the unconstrained problem to obtain respective optimal position of one or more Steiner nodes, each of the one or more Steiner nodes corresponding to a respective one of the one or more connection points.

Optionally, the Lagrange multiplier based method applies a Lagrangian function that can be represented as:

$$L(S, \lambda) = f(S) + \sum_{k=1}^{|R|} \lambda_k (g_k(S) - b_k(x_i, x_j)) + c_b \cdot N_b,$$

where L(S·A) is a Lagrangian function of s and λ; $\lambda = [\lambda_1, \lambda_2, \ldots, \lambda_{|R|}]^T$ is the vector of Lagrange multipliers, $\lambda_k \ge 0$; f(S) represents the infrastructure link laying cost of the infrastructure link network; $g_k(S)$ denotes $d_k$ which is determined by the position of Steiner node(s) on a path of one or more infrastructure links between constrained nodes $x_i$ and $x_j$.

Optionally, the one or more processors are arranged to: apply fast marching method to each of the terminal nodes to obtain corresponding distance maps; and process the distance maps and a predetermined Steiner tree topology based on a directed acyclic graph based dynamic programming algorithm to obtain respective coordinate of the one or more Steiner nodes.

Optionally, the one or more constraints consist of a single constraint associated with a maximum path length between two of the geographic locations, the maximum path length being defined by one or more of the infrastructure links between the two of the geographic locations.

Optionally, the one or more processors are further arranged to: update the distance maps based on a value of λ associated with the single constraint; and process the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s).

Optionally, the one or more processors are further arranged to: (1) update the value of $\lambda$ based on a primal-dual subgradient method; (2) update the distance maps based on the updated value of $\lambda$; and (3) process the updated distance maps and the predetermined Steiner tree topology based on the directed acyclic graph based dynamic programming algorithm to obtain updated coordinates of one or more Steiner nodes. These one or more Steiner nodes may be intermediate Steiner node(s) to be further optimized or may be optimized Steiner node(s).

Optionally, the one or more processors are further arranged to: iteratively repeat steps (1) to (3) until or after a predetermined condition is met.

Optionally, the one or more processors are further arranged to: iteratively repeat steps (1) to (3) until or after a limit of the constraint is reached, until or after a threshold associated with a limit of the constraint is reached, or until or after a predetermined number of iterations is completed, so as to obtain respective optimal position of the one or more Steiner nodes.

Optionally, the one or more constraints comprise a plurality of constraints associated with a corresponding plurality of maximum path lengths each between respective two of the geographic locations, each of the maximum path lengths being defined by one or more of the infrastructure links between the two of the geographic locations.

Optionally, the one or more processors are further arranged to: update the distance maps based on values of two or more $\lambda$s each associated with a respective one of the constrains; and process the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s).

Optionally, the one or more processors are further arranged to: (1) update all of the values of $\lambda$s based on a primal-dual subgradient method; (2) update the distance maps based on the updated values of $\lambda$s; and (3) process the updated distance maps and the predetermined Steiner tree topology based on the directed acyclic graph based dynamic programming algorithm to obtain updated coordinates of one or more Steiner nodes. These one or more Steiner nodes may be intermediate Steiner node(s) to be further optimized or may be optimized Steiner node(s).

Optionally, the one or more processors are further arranged to: iteratively repeat steps (1) to (3) until or after a predetermined condition is met.

Optionally, the one or more processors are further arranged to: iteratively repeat steps (1) to (3) until or after respective limits of one or more of the constraints is reached, until or after respective thresholds associated with respective limits of one or more of the constraints is reached, or until or after a predetermined number of iterations is completed, so as to obtain respective optimal position of the one or more Steiner nodes.

In some embodiments, the infrastructure link network comprises a submarine communication cable network. Optionally, the cost for constructing the submarine communication cable network comprises cost associated with laying and constructing (i) the communications cables and (ii) one or more branching units for connecting with at least two of the communications cables, each of the one or more branching units is arranged at a respective one of the one or more connection points. In some embodiments, the cost associated with laying and constructing the communications cables and the one or more branching units includes, at least, cable cost, cable laying cost (e.g., cost associated with labour, materials, permits), and branching unit cost. In some embodiments, the one or more constraints comprise a maximum communication cable path length between two of the geographic locations. The maximum communication cable path length is defined by one or more of the communications cables, and is associated with maximum permissible latency between the two of the geographic locations.

In some embodiments, the infrastructure link network comprises a pipeline network. Optionally, the cost for constructing the pipeline network comprises cost associated with laying and constructing (i) the pipes and (ii) one or more manifolds for connecting with at least two of the pipes, each of the one or more manifolds is arranged at a respective one of the one or more connection points.

In some embodiments, the infrastructure link network comprises a road network. Optionally, the cost for constructing the pipeline network comprises cost associated with laying and constructing (i) the roads and (ii) one or more junctions for connecting with at least two of the roads, each of the one or more junctions is arranged at a respective one of the one or more connection points.

Optionally, the system further comprises a display operably connected with the one or more processors for displaying the determined path arrangement of the infrastructure link network overlaid on a model of the geographic terrain.

In a sixth aspect, there is provided a method comprising: the method of the first aspect; and constructing (e.g., building) at least part of the infrastructure link network based on the determined arrangement. Optionally, the constructing (e.g., building) comprises modifying an existing infrastructure link network.

In a seventh aspect, there is provided an infrastructure link network constructed based on the method of the sixth aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 17:
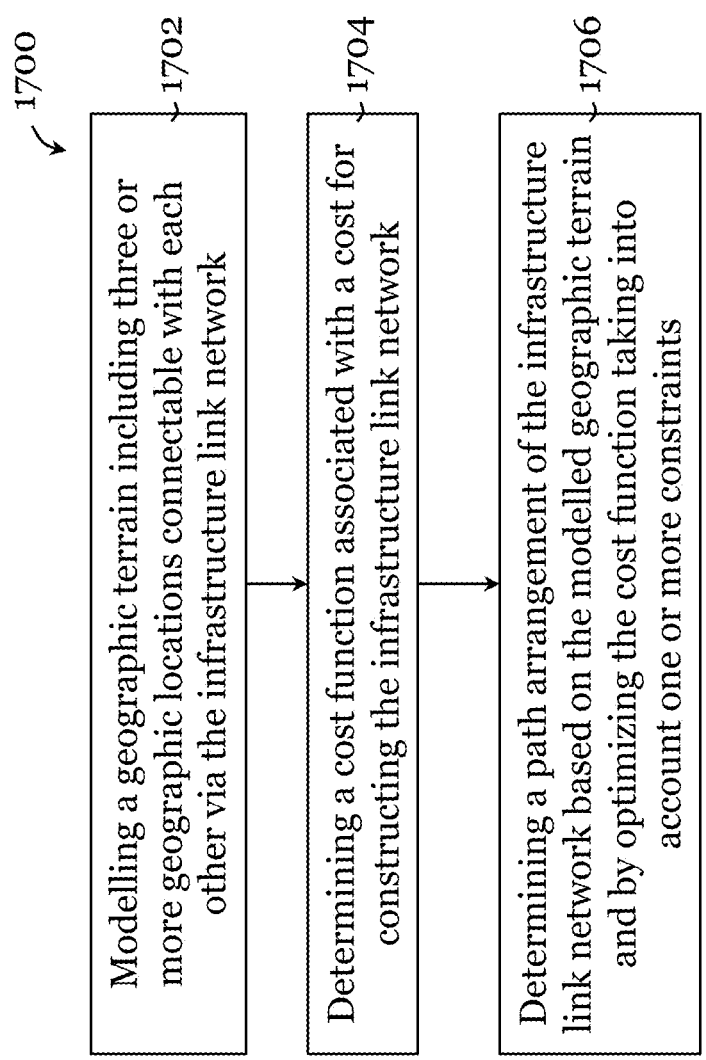
FIG. 17 is a flowchart illustrating a computer-implemented method for determining a path arrangement of an infrastructure link network with a trunk-and-branch topology in one embodiment of the invention.

FIG. 17 illustrates a computer-implemented method 1700 for determining a path arrangement of an infrastructure link network with a trunk-and-branch topology.

In this embodiment, the method includes, at in step 1702, modelling a geographic terrain including three or more geographic locations. The geographic locations are connectable with each other via an infrastructure link network with a trunk-and-branch topology. The geographic terrain may be modelled as an irregular two-dimensional (2D) manifold in three-dimensional (3D) Euclidean space. In some embodiments, the irregular 2D manifold in 3D Euclidean space includes a triangulated piecewise-linear 2D manifold in 3D Euclidean space. The 2D manifold may include multiple nodes each representable or represented by a 3D coordinate (position x, y and altitude z).

The method 1700 also includes, in step 1704, determining a cost function associated with a cost for constructing the infrastructure link network that connects the geographic locations. The cost function may be a location dependent cost function. In one example, the cost function is a depth dependent cost function. The cost function includes one or more cost factors which may be respectively weighted to assign different importance/significance to different cost factors. The cost includes or consists of costs associated with laying and/or constructing the infrastructure links and one or more connector units each connecting two or more of the infrastructure links (each connector unit is arranged at a respective connection point).

The method 1700 also includes, in step 1706, determining a path arrangement of the infrastructure link network based on the modelled geographic terrain and by optimizing the cost function taking into account one or more constraints. The path arrangement of the infrastructure link network having a trunk-and-branch topology and comprises: three or more infrastructure links that connect the three or more geographic locations, and one or more connection points each arranged between two or more of the infrastructure links. In some embodiments, the optimization of the cost function is a minimization of the cost function. The one or more constraints may include a single constraint or multiple constraints, which may include a maximum path length between two of the geographic locations as defined by one or more of the infrastructure links between the two of the geographic locations. The determining of the path arrangement may include determining a total number of and/or respective position of the connection point(s).

In some embodiments, in step 1706, the determination of the path arrangement of the infrastructure link network includes: formulating the determination of the path arrangement of the infrastructure link network as a Steiner Minimal Tree problem taking into account the one or more constraints; and solving the Steiner Minimal Tree problem taking into account the one or more constraints. In these embodiments, the trunk-and-branch topology of the path arrangement of the infrastructure link network generally corresponds to a Steiner topology (e.g., a full Steiner topology or a degenerate Steiner topology). In some embodiments the Steiner Minimal Tree problem can be formulated as a constrained Steiner Minimal Tree problem, which can be represented by:

$$\min_{S \in H, \Gamma} F(S) = f(S) + c_b \cdot N_b$$

$$\text{s.t. } d_k(x_i, x_j) \le b_k(x_i, x_j),$$

$$k = 1, \ldots, |R|$$

where H is a set of mesh points in the modelled geographic terrain; $\Gamma$ is a set of geodesic curves of the Steiner tree; R is a set of one or more constraints; $S=\{s_1, s_2, \ldots, s_{N_b}\}$ is a set of positions of one or more Steiner nodes in the modelled geographic terrain; f(S) is an infrastructure link laying cost of the infrastructure link network, which is dependent on the positions of the one or more Steiner nodes S and the geodesic curves $\Gamma$; $N_b$ is the number of Steiner nodes; $c_b$ is the cost of each connector unit; $x_i$ and $x_j$ are any pair(s) of terminal nodes subjected to constrain factor(s), each of the terminal nodes corresponding to a respective one of the geographic locations; $b(x_i, x_j)$ is a value of the constraint; and $d_k(x_i, x_j)$ is a path length defined by one or more infrastructure links between nodes $x_i$ and $x_j$. In some embodiments, the solving of the constrained Steiner Minimal Tree problem comprises: converting the constrained Steiner Minimal Tree problem into an unconstrained problem based on a Lagrange multiplier based method; and determining a solution for the unconstrained problem. The solution provides respective optimal position of one or more Steiner nodes, each corresponds to a respective connection point. In some embodiments, the Lagrange multiplier based method applies a Lagrangian function that can be represented as:

$$L(S, \lambda) = f(S) + \sum_{k=1}^{|R|} \lambda_k (g_k(S) - b_k(x_i, x_j)) + c_b \cdot N_b,$$

where $L(S, \lambda)$ is a Lagrangian function of s and $\lambda$; $\lambda = [\lambda_1, \lambda_2, \ldots, \lambda_{|R|}]^T$ is the vector of Lagrange multipliers, $\lambda_k \ge 0$; f(S) represents the infrastructure link laying cost of the infrastructure link network; $g_k(S)$ denotes $d_k$ which is determined by the position of Steiner node(s) on a path of one or more infrastructure links between constrained nodes $x_i$ and $x_j$.

As an example, the one or more constraints consists of a single constraint associated with a maximum path length between two of the geographic locations. In this example, the determining of the solution comprises: applying fast marching method to each of the terminal nodes (modelled geographical locations) to obtain corresponding distance maps; and processing the distance maps and a predetermined Steiner tree topology based on a directed acyclic graph based dynamic programming algorithm to obtain respective coordinate of the one or more Steiner nodes. These one or more Steiner nodes may be intermediate Steiner node(s) to be further optimized or may be optimized Steiner node(s). If the determined Steiner node(s) is/are intermediate Steiner node(s), the determining of the solution may further include: updating the distance maps based on a value of λ associated with the single constraint; and processing the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s). In some embodiments, the determination further involves: updating the value of λ based on a primal-dual subgradient method; updating the distance maps based on the updated value of λ; and processing the updated distance maps and the predetermined Steiner tree topology based on the directed acyclic graph based dynamic programming algorithm to obtain updated coordinates of one or more Steiner nodes. These updating and processing steps can be repeated interactively until or after a predetermined condition is met, so as to obtain respective optimal position of the one or more Steiner nodes. The predetermined condition may be, e.g., until or after a limit of the constraint is reached, until or after a threshold associated with a limit of the constraint is reached, or until or after a predetermined number of iterations is completed.

As another example, the one or more constraints consists of a multiple constraints each associated with a respective maximum path length between two of the geographic locations. In this example, the determining of the solution comprises: applying fast marching method to each of the terminal nodes (modelled geographical locations) to obtain corresponding distance maps; and processing the distance maps and a predetermined Steiner tree topology based on a directed acyclic graph based dynamic programming algorithm to obtain respective coordinate of the one or more Steiner nodes. These one or more Steiner nodes may be intermediate Steiner node(s) to be further optimized or may be optimized Steiner node(s). If the determined Steiner node(s) is/are intermediate Steiner node(s), the determining of the solution may further include: updating the distance maps based on values of two or more λs each associated with a respective one of the constrains; and processing the updated distance maps and the predetermined Steiner tree topology based on the directed acyclic graph based dynamic programming algorithm to obtain further respective coordinate of the one or more Steiner nodes. These one or more Steiner nodes may be intermediate Steiner node(s) to be further optimized or may be optimized Steiner node(s). In some embodiments, the determination further involves: updating all of the values of λs based on a primal-dual subgradient method; updating the distance maps based on the updated values of λs; and processing the updated distance maps and the predetermined Steiner tree topology based on the directed acyclic graph based dynamic programming algorithm to obtain updated coordinates of one or more Steiner nodes. These updating and processing steps can be repeated interactively until or after a predetermined condition is met, so as to obtain respective optimal position of the one or more Steiner nodes. The predetermined condition may be, e.g., until or after respective limits of one or more of the constraints is reached, until or after respective thresholds associated with respective limits of one or more of the constraints is reached, or until or after a predetermined number of iterations is completed.

Although not specifically illustrated, the method 1700 may further include, after step 1706, displaying the determined path arrangement. The displaying may include displaying the determined path arrangement of the infrastructure link network overlaid on a model of the geographic terrain.

In some embodiments, in method 1700, the infrastructure link network is a submarine communication cable network, which case the cost for constructing the submarine communication cable network comprises cost associated with laying and constructing the communications cables and one or more branching units (each arranged at a connection point) for connecting with at least two of the communications cables. In some embodiments, the cost associated with laying and constructing the communications cables and the one or more branching units includes, at least, cable cost, cable laying cost (e.g., cost associated with labour, materials, permits for laying cables), and branching unit cost. In some embodiments, the one or more constraints includes one or more maximum communication cable path length (associated with the maximum permissible latency) between two of the geographic locations.

The following description provides some embodiments of the invention (specific examples of method 1700) for determining path arrangement of a submarine communication cable network (with trunk-and-branch topology). It should be noted that the invention is not limited in its application to submarine communication cable network and can be used for determining path arrangement of other infrastructure link networks.

The inventors of the invention have realized that an important consideration of submarine communication cable system design is the total construction cost of the submarine communication cable system, which can be significant (e.g., in the order of billions). The total construction cost may include the costs of the cables, the costs for laying the cables, and the costs of the branching units, and the cable laying cost may include costs associated with labor, materials, and permits. Note that in submarine communications cable systems, a branching unit is a device used to split a cable to multiple cables for reaching multiple destinations, and the cost of a branching unit is mainly determined by its complexity and its number of ports.

The inventors of the invention have also realized that in order to reduce costs for constructing the submarine communication cable system, performance measures to be optimized include the length of the cable and the depth of the earth surface at which the cable is or will be laid. Generally, laying the cable in deep waters is safer, as it can reduce various risks caused by human-related activities such as fishing. In the optimization of cost function in the following embodiments, lower costs are imposed in deeper waters and higher costs are imposed in shallower waters and hence the optimization uses location-dependent data, i.e., earth surface depth. The inventors of the invention have realized that laying cables on the seabed has several advantages over land. For example, the cost of laying on the seabed is normally lower and the construction speed is faster than on land (cables laid on land need to be underground or above ground on pylons, and may go through private property). For example, seawater can prevent external optical and magnetic waves and interference, thereby improving the communication quality of the optical cable. For example, compared with cables on land, submarine cables are less susceptible to interference and damage by human activities. In the optimization of cost function or objective weighted cost function in the following embodiments, the cost on land is higher than undersea and the cost is decreased with depth because cables are generally safer in deeper waters.

The inventors of the invention have realized that in the industry, there exists a prejudice to use a manual approach (based on expert experience) for path planning of submarine cables. The inventors of the invention have devised that: in practice, the length of long-haul submarine cables may be thousands of kilometers, so manual path planning without a scalable, automated software tool can be costly and may not achieve the desired optimal cost-risk optimization. The inventors of the invention have realized that automated, algorithm-based cable path planning for submarine cables, involving optimization of objectives associated with cost and risk based on quality of service requirements, can enhance the manual approach currently used by cable path and system planners, designers, and surveyors. While the cable path and system planners, designers, and surveyors may or may not use the automated, algorithm-based method and solutions directly to design cable routes, consideration of the automated, algorithm-based solutions informs the manual approach, especially when there are latency requirements between specific pairs of nodes. For example, the automatic-algorithm solutions may indicate areas where more seabed data needs to be collected. For example, cost functions can be adjusted based on practical feedback from industry system and cable planners, designers, and surveyors, and such adjustment may lead to more accurate solutions.

The inventors of the invention have realized that in practice, in addition to the depth of the earth surface, submarine communication cable path planning may take into account other location-dependent factors/issues, such as earthquake-prone areas, surfaces that have steep slopes or harmful rocks, heavy fishing activity areas, and areas that involve specific legal requirements, etc., and longer cables may be used to avoid such places or area. Some embodiments of the invention consider a length-(or latency-) aware design and a location-dependent cost function. However, in the following, for simplicity of exposition, only depth is taken into account in the location-dependent cost function. It should be noted, however, that the embodiments can be extended to consider the above-mentioned issues by imposing a summary cost function where the weights of the various design considerations are empirically obtained, if the relevant data is available.

The inventors of the invention have also realized that another important factor in the design of submarine communication cable system is latency, i.e., the time required for data to be transmitted between two terminals of communication, which is related to, among other things, the length of the cable. Generally, a lower latency network can enable a higher quality of experience associated with the network and the applications that use the network. In some cases, traffic between end nodes needs to pass through other nodes. The intermediate nodes may further increase total latency because the data packet has to be passed to the upper electrical layer for packet analysis and processing. The latency of intermediate nodes (branch units or cable landing stations) may be non-deterministic and needs to be analyzed on a device-by-device basis. This is related to the way they process incoming signals. The inventors of the invention have appreciated that the use of optical bypass can help to avoid such delays. Thus, in some embodiments, a bypass may be implemented in every intermediate node, so there is no or little intermediate processing delay.

The inventors of the invention have devised, through research, experiments, and trials, that submarine communication cable systems can be designed in various topologies, e.g., point-to-point topology, ring topology, mesh topology, trunk-and-branch topology, etc. For cable path planning between two terminals (e.g., two geographic locations), point-to-point topology can be used; for three or more terminals (e.g., three or more geographic locations), a trunk-and-branch topology can be used. When planning or designing a new submarine communication cable system, the specified terminals (e.g., geographic locations) can be connected by a tree-like (trunk-and-branch topology) cable system and the latency constraints for some pairs of terminals have to be satisfied without taking into account communication through other cables.

The inventors of the invention have devised, through research, experiments, and trials, that the problem of submarine communication cable system design with trunk-and-branch topology can be regarded as a Steiner Minimal Tree (SMT) problem on the submarine surface of the earth. In some embodiments, the submarine surface of the earth can be represented by a triangulated 2D manifold in a 3D Euclidean space. An overview of the SMT problem is as follows. Given a map of a particular geographic area and the set of terminal nodes N in the area, design a connected system to connect all the terminal nodes with the objective of minimizing the total length of all the cable links. In this way, any two terminal nodes are necessarily connected either directly or through one or more intermediate nodes, which may be existing terminal nodes or extra introduced nodes (Steiner nodes). Such an optimal system connecting terminal and Steiner nodes is always a tree—an SMT. The SMT problem is NP-hard hence the solution to the problem is not scalable to large systems. While existing SMT algorithms can find the Steiner points based on the angle condition for Steiner points in the plane, these algorithms cannot be directly applied to the situation of an irregular 2D manifold in 3D Euclidean space.

The following embodiments concern the optimization of the location of branching units as well as the total system cost, including both the layering cost and branching unit cost, subject to a latency constraint (length constraint) between specified pairs of terminal nodes. The following embodiments are based on solving a constrained SMT problem, in which the branching units are the Steiner nodes (for optimizing the Steiner tree topology as well as the locations of Steiner nodes). In these embodiments, the objective function to be minimized is the total cost of the tree system, including the cost of constructing cables and branching units.

Specific embodiments of the invention applied to submarine communication cable network are now described.

Problem Modeling and Formulation

The following first presents models of submarine landforms and cable laying cost in some embodiments of the invention. In these embodiments, the cable system optimization problem is formulated as an SMT with constraint(s) (constrained SMT) problem.

For the problem modelling in these embodiments, a region on the earth's surface is denoted by $\mathbb{D}$ and $x_1, x_2, \ldots, x_N$ are denoted as the terminal nodes in $\mathbb{D}$. The goal of these embodiments is to optimize the submarine communication cable system with trunk-and-branch tree topology for these terminal nodes to minimize the overall cost and, at the same time, impose one or more constraints on the distances between one or more specified pairs of terminal nodes. The overall cost of a cable system includes the sum of the costs for all the cables, as well as costs for one or more newly introduced nodes, which corresponds to Steiner nodes (represent branching units in cable systems). The following notations are used: $\gamma_{(A,B)} \in \mathbb{D}$ (geodesic) is used to denote a cable connecting two end nodes A, B$\in \mathbb{D}$. Curves in $\mathbb{D}$ are assumed to be parametrized according to the natural parametrization, i.e., parametrizing a curve $\gamma$ as a function of arc length denoted by S, so that a curve $\gamma:[0,l(\gamma)] \to \mathbb{D}$ is a function from the interval $[0,l(\gamma)]$, taking values in $\mathbb{D}$, where $l(\gamma)$ is the length of the curve $\gamma$.

To represent the earth's surface, a triangulated piecewise-linear 2D manifold $\mathbb{M}$ in $\mathbb{R}^3$ is used to approximate the region $\mathbb{D}$. Each node h in this manifold $\mathbb{M}$ is represented by 3D coordinates (x, y, z), where $z=\xi(x, y)$ is the altitude of the geographic location (x, y). Generally, the more nodes there are, the higher the resolution of the representation, and the more realistic the obtained optima result will be. The aim of these embodiments is to find the optimal solution to the problem given the representation.

In these embodiments, the cost per unit length used in the optimization at location/is is c(h). Details of this representation can be found in Z. Wang, Q. Wang, M. Zukerman, J. Guo, Y. Wang, G. Wang, J. Yang, and B. Moran, "Multiobjective path optimization for critical infrastructure links with consideration to seismic resilience," *Computer-Aided Civil and Infrastructure Engineering*, vol. 32, no. 10, pp. 836-855, 2017. The total cost used in the optimization of the cable $\gamma$ is $C(\gamma)$, which is the objective function cost to be minimized. This is different from the actual cable cost as it is adjusted to include a risk component. Applying the additivity assumption of the cost, such as that disclosed in Q. Wang, J. Guo, Z. Wang, E. Tahchi, X. Wang, B. Moran, and M. Zukerman, "Cost-effective path planning for submarine cable network extension," *IEEE Access*, vol. 7, pp. 61 883-61 895, 2019 and Z. Wang, Q. Wang, M. Zukerman, J. Guo, Y. Wang, G. Wang, J. Yang, and B. Moran, "Multiobjective path optimization for critical infrastructure links with consideration to seismic resilience," *Computer-Aided Civil and Infrastructure Engineering*, vol. 32, no. 10, pp. 836-855, 2017, $C(\gamma)$ can be written as $$C_{(\gamma)} = \int_0^{l(\gamma)} c(\gamma(s)) ds. \quad (1)$$

Generally, a branching unit is a Y-shaped cable connector connecting three terminals. The following embodiments only consider branching units with three branches. Without wishing to be bound by theory, other embodiments of the invention may consider other types of branching units, e.g., branching units with four branches (e.g., when two Y-shaped Branching units are directly connected to each other, each one of them is connected to two other terminals). Generally, 4-branch branching units are less stable and hence are less commonly used than 3-branch branching units.

In terms of problem formulation, these embodiments formulate the optimal path design for submarine communication cable systems with trunk-and-branch tree topology as a constrained SMT problem (i.e., a SMT problem with one or more constraints). The edges of the SMT here are minimal cost geodesics in M, with the cost given by Equation (1), rather than straight lines. In these embodiments, the problem is based on a manifold model, the cable path between pairs of terminals is obtained by the Fast Marching method, and optimal connections between nodes, i.e., geodesics, are curved.

To formulate this problem in a form useful for computation, define H as the set of mesh points in $\mathbb{M}$, and H is compact; N as the number of terminal nodes, R as the set of latency constraints; $N_b$ as the number of Steiner nodes; $C_b$ as the cost of a branching unit; $S=\{s_1, s_2, \ldots, s_{N_b}\}$ as the set of positions of Steiner nodes in $\mathbb{M}$; $\Gamma$ as the set of geodesic curves of the Steiner tree; and f(S) as the cable laying cost of the cable system which depends on the position of Steiner nodes s and geodesic curves $\Gamma$.

$$f(S) = \sum_{\gamma_i \in \Gamma} C(\gamma_i). \quad (2)$$

The cable system optimization problem corresponding to a constrained SMT can then be represented as:

$$\min_{S \in H, \Gamma} F(S) = f(S) + c_b \cdot N_b \quad (3)$$

$$\text{s.t. } d_k(x_i, x_j) \le b_k(x_i, x_j), k = 1, \ldots, |R|$$

where $x_i$ and $x_j$ are any pair of terminal nodes with latency requirement; the value of the latency requirement is written as $b(x_i, x_j)$, $d_k(x_i, x_j)$ is the length of the cable path between nodes $x_i$ and $x_j$, $$d_k(x_i, x_j) = \sum_{\gamma_\mu \in E_k} l(\gamma_\mu)$$

where $E_k$ is the set of geodesic curves between nodes $x_i$ and $x_j$, $E_k = \{\gamma_{(x_i, s_1)}, \gamma_{(s_1, s_2)}, \ldots \gamma_{(s_n, x_j)}\}$, $S_i$ is the intermediate Steiner node in the path between nodes $x_i$ and $x_j$. In some embodiments, there may be latency constraints on several pairs of nodes.

Figure 1:
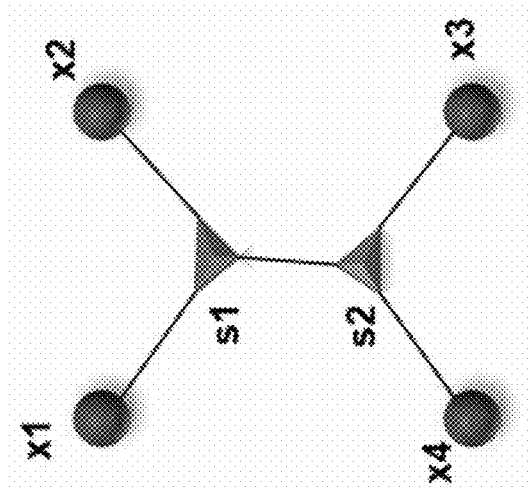
FIG. 1 is a schematic diagram illustrating a constrained Steiner Minimal Tree problem in one embodiment.

FIG. 1 shows an example which involves four nodes (x1, x2, x3, x4) and two Steiner nodes (s1, s2). Note that in FIG. 1 there are five links/cables (one between x1 and s1, one between x2 and s1, one between s1 and s2, one between x4 and s2, one between x3 and s2). There is a constraint on the length of the path between x1 and x2, i.e., $d(x_1, x_2) \le b(x_1, x_2)$. This constrained optimization problem in this case can be formulated as:

$$\min_{s_1, s_2 \in H, \Gamma} F(s_1, s_2) = f(s_1, s_2) + 2c_b \quad (4)$$

$$\text{s.t. } l(\gamma(x_1, s_1)) + l(\gamma(s_1, x_1)) \le b(x_1, x_2)$$

Solution

Some embodiments of the invention provides a method called Lagrangian Fast Marching (LAFM) method for solving the constrained SMT problem on the manifold discussed above. In these embodiments, first, a Lagrangian penalty-function approach is applied to convert the constrained problem to an unconstrained problem. An example of the Lagrangian penalty-function approach may be that described in H. Everett III, "Generalized Lagrange multiplier method for solving problems of optimum allocation of resources," Operations Research, vol. 11, no. 3, pp. 399-417, 1963. In the following examples, a LAFM-I algorithm for solving the single constraint problems and a LAFM-II for solving the multiple constraints problems are provided.

LAFM for a Given Topology

To convert the problem in Equation (3) to an unconstrained problem, first construct the simultaneous equations using a Lagrange multiplier model:

$$L(S, \lambda) = f(S) + \sum_{k=1}^{|R|} \lambda_k (g_k(S) - b_k(x_i, x_j)) + c_b \cdot N_b \quad (5)$$

where $\lambda = [\lambda_1, \lambda_2, \ldots, \lambda_{|R|}]^T$ is the vector of Lagrange multipliers and A. $\lambda_k \geq 0$. f(S) represents the cable laying cost of the system. $g_k(S)$ re-denotes $d_k$ which is determined by the position of Steiner nodes on the path between constrained nodes $x_i$ and $x_j$. For a cable system with a given topology and terminals, f(S) and g(S) are functions of the Steiner nodes S and the cable paths.

Before trying to find the optimal solution of the constrained problem (3), the case where the optimal solution does not exist has to be eliminated. That is, if one of the constraints, k, is such that $l_{(\gamma_{k(xi,xj)})} > b_{k_{(xi, xj)}}$, i.e., the allowed maximum length of the path connecting $x_i$ and $x_j$ (via Steiner nodes) is less than the length of the geodesic curve between them (whether or not it is via Steiner nodes), then there is no optimal solution for the problem (3). It is assumed that this is not the case, and therefore, that an optimal solution of the problem (3) exists.

Define $m_L^*(\lambda)$ as $$m_L^*(\lambda) = \min_{s \in H, \Gamma} L(s, \lambda). \quad (6)$$

Then the dual problem to (5) can be formulated as $$\max_{\lambda} \min_{S,\Gamma} L(S, \lambda) = \max_{\lambda} m_L^*(\lambda) \quad (7)$$

By weak duality, for any given $\lambda \geq 0$, $m_L^*(\lambda)$ provides a lower bound on the optimal value of the problem (3) if s is feasible with respect to the constraints in problem (3). The optimal solution of the primal problem (3) is equal to the solution to the dual problem (7) if the latter satisfies the complementary slackness condition, i.e., $\lambda_k g_k(S^*) = \lambda_k b_k(x_i, x_j)$, k=1, 2, . . . |R|, where S* solves the dual problem for $\lambda = \lambda^*$.

The following first considers the SMT problem in the case of only one latency constraint. This problem can be solved by an LAFM-I algorithm in some embodiments, which, under mild assumptions, can find the optimal solution of the primal problem (3). The following then considers the SMT problem in the case of more than one latency constraints. This problem can be solved by an LAFM-II algorithm in some embodiments, which, under some circumstances, can find an optimal solution to the primal problem (3). The LAFM-II algorithm can generally provide a reasonably optimal solution.

LAFM Method for One Latency Constraint Problem

In some embodiments there is provided a LAFM-I algorithm for solving the constrained SMT problem (with a single constraint). Details of the LAFM-I algorithm can be found in Algorithm 1.

---

Algorithm 1 The LAFM-I Algorithm.

Input:
    Coordinates of N terminal nodes, the constrained pair of nodes ($x_i$, $x_j$), the constraint requirement b, cable laying cost c, BU construction cost $c_b$, and the topology of Steiner tree.

Output:
    Coordinates of Steiner nodes S* = {$s_i$, i = 1, 2, . . . , m − 2}, and the path of the Steiner tree, Γ.

1: Run FMM for each terminal node $x_i$, i = 1, 2, . . . , n, to obtain the corresponding level set (distance map) $d_i$,
2: Obtain the coordinates of Steiner nodes S by executing the DAG-Least-Cost-System algorithm with input of distance map $d_i$ and the given topology.
3: if $(l(\gamma_{i(x_i,x_j)}) - b) < 0$ then
4:     return ∅;
5: else
6:     Let $\lambda^0$ be a large number which leads to a feasible solution;
7:     Update the distance map $d_i$ according to the value of the $\lambda$ associated with the constraint:
    $d_{x_i} = (1 + \lambda) \cdot d_{x_i}$, $d_{x_j} = (1 + \lambda) \cdot d_{x_j}$,
    where $x_i$ and $x_j$ are the constrained pair of nodes.
8:     Obtain the coordinates of Steiner nodes S by executing the DAG-Least-Cost-System algorithm with the updated $d_i$ and the given topology.
9:     while $y(S) - b \neq 0$ do
10:         $\lambda^{I+1} = \lambda^I + \frac{1}{I} \cdot \frac{g(S^I) - b}{|g(S^I) - b|};$
11:         Update the distance map $d_i$ with new $\lambda$;
12:         Obtain the coordinates of Steiner nodes S by executing the DAG-Least-Cost-System algorithm with the updated $d_i$ and the given topology.
13:         I = I + 1;
14:     end while
15: end if
16: Obtain the optimal result with Steiner nodes S*;
17: Calculate the minimum cost T for the given topology.
    T = f(S*) + $N_b \cdot c_b$;
18: return S, Γ and T.

---

As shown in Algorithm 1, LAFM-I can be considered as an extension of the dynamic programming algorithm for a Directed Acyclic Graph (DAG)-Least-Cost-System disclosed in Z. Wang, Q. Wang, B. Moran, and M. Zukerman, "Optimal submarine cable path planning and trunk-and-branch tree network topology design," *IEEE/ACM Transactions on Networking*, vol. 28, no. 4, pp. 1562-1572 August 2020 and T. Wang, Z. Wang, B. Moran, and M. Zukerman, "*Submarine cable network design for regional connectivity,*" 2022, . . . accepted for publication in IEEE/ACM Transactions on Networking; Earlier version is available in arXiv. [Online]. Available: https://arxiv.org/abs/2201.05802. The DAG-Least-Cost-System is used in the disclosure to find the SMT without any latency constraints on a triangulation irregular 2D manifold in a 3D space for a given topology.

LAFM-I obtains S* by finding the minimum value of L(S. $\lambda$) in Equation (5) for a fixed $\lambda$ at every iteration. On the premise that $l(\gamma_{(x_i,x_j)}) \leq b$, LAFM-I starts with $\lambda$ equal to a large number, leading to a feasible solution, then updates $\lambda$ along the lines of the primal-dual subgradient method. An example implementation of the primal-dual subgradient method can be found in Y. Nesterov, "*Primal-dual subgradient methods for convex problems,*" *Mathematical Programming*, vol. 120, no. 1, pp. 221-259, 2009.

More specifically, at iteration I. $\lambda^I$ is updated by $$\lambda^{I+1} = \lambda^I + \frac{1}{I} \cdot \frac{g(S^I) - b}{|g(S^I) - b|}, \text{ if } g(S^I) - b \neq 0. \quad (8)$$

where b is the allowed maximum latency, g(s') is smaller than b when LAFM-I starts with λ large enough to lead to a feasible solution. The value of λ decreases from one iteration to the next, and, as mentioned, g(s) increases with decreasing λ, whereas f(s) decreases. When g(s) takes the maximum value that satisfies the constraints, f(s) takes the minimum value, and this is the optimal solution to be sought.

Optimality of LAFM-I

To prove that LAFM-I finds the optimal solution of the primal problem (3), write:

$M_\lambda = \{S : L(S, \lambda) = m_L^*(\lambda)\}$ $m_f(\lambda) = \min \{f(S) : L(S, \lambda) = m_L^*(\lambda)\}$ $m_g^*(\lambda) = \max \{g(S) : L(S, \lambda) = m_L^*(\lambda)\}$ Then, the following assumptions are made:

Assumption 1: Both f(S) and g(S) are continuous in S.

Assumption 2: For each value of A, $|M_\lambda| = 1$.

The following theorem proves the optimality of LAFM-I:

Theorem 1: For a given topology, under Assumptions 1 and 2, LAFM-I can provide an optimal solution for cable system design taking into account cable laying cost, branching unit cost, as well as a latency constraint for one pair of terminal nodes.

The proof of Theorem 1 relies on the following Lemma 1.

Lemma 1: For a fixed given topology, and one latency requirement, $m_f^*(\lambda)$ is non-decreasing in Δ and $m_g^*(\lambda)$ is continuous and non-increasing in λ. For simplicity, the detailed proof of Lemma 1 is not provided below.

Figure 2:
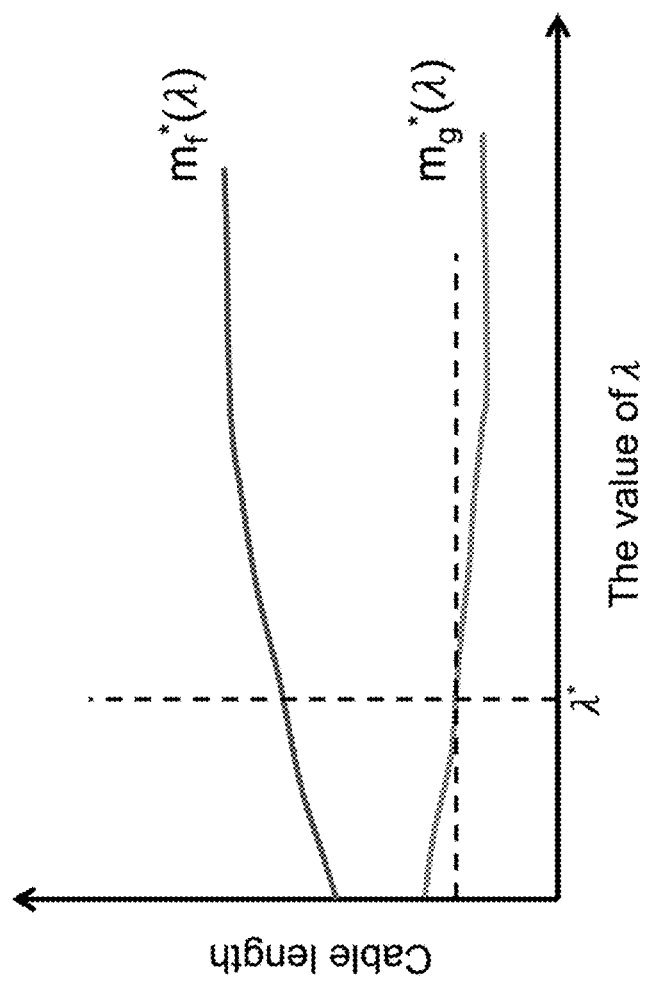
FIG. 2 is graph illustrating monotonicity of $m_f^*$ and $m_g^*$ in a Lagrangian fast marching method in one embodiment.

Proof of Theorem 1: The monotonicity of $m_g^*(\lambda)$ and $m_f^*(\lambda)$ is illustrated in FIG. 2. For a given latency requirement b, and $l_{(x_i,x_j)} < 0$, start with a large λ in Algorithm 1, and adjust λ according to Equation (8). By the monotonicity and continuity of $m_g^*(\lambda)$, such a λ* can be found for which g(S*)=b. Then, the corresponding set of Steiner nodes S*, for λ=λ*, is the optimal solution of the primal problem (3) since it satisfies the complementary slackness condition.

In some embodiments, due to the limited accuracy of terrain data sampling, there can be no guarantee that a path with a length equal to the value of the latency constraint can be found. In some implementation, the iteration in Algorithm 1 will be stopped once the length of the constrained path is very close to (e.g., reaches a threshold related to) the latency requirement.

Figure 3:
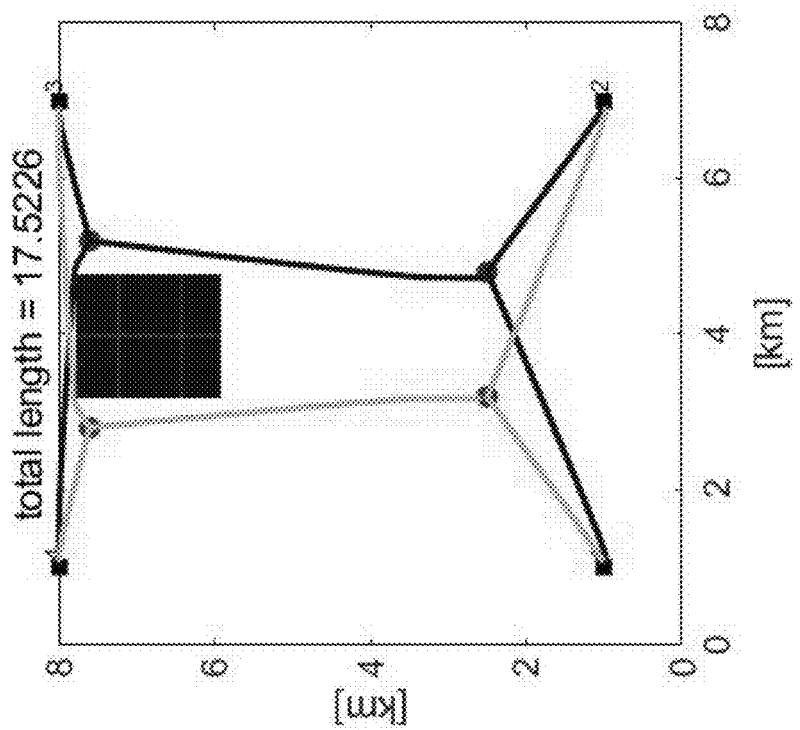
FIG. 3 is a graph illustrating a plot when $|M_\lambda|=2$ in a Lagrangian fast marching method in one embodiment.

The optimality proof of LAFM-I is based on Assumptions 1 and 2. Assumption 2 is a condition for the continuity of $m_g^*(\lambda)$, and it is not straightforward and may not be always true. FIG. 3 shows an example where $|M_\lambda|=2$. Without Assumption 2, $m_g^*(\lambda)$ would be semi-continuous, and under this circumstance, the problem of determining in which scenarios LAFM-I can find S* such that g(S*)=b is much deeper. In some implementations, the least upper bound on f(S) in the iteration is kept and output as a suboptimal solution of the primal problem (3).

LAFM Method for Multiple Latency Constraints Problem

Generally, problems with more than one latency requirement are more complicated than problems with only one latency requirement.

In some embodiments there is provided a LAFM-II algorithm for solving the constrained SMT problem (with multiple constraints). Details of the LAFM-II algorithm can be found in Algorithm 2. LAFM-II can be considered as an extension of LAFM-I to the multiple μs case.

---

Algorithm 2 The LAFM-II Algorithm.

Input:
  The coordinates of N terminal nodes, the set of constraint requirements R = {$r_k$}, k = 1, 2, . . . , |R|, which illustrate some pairs of nodes with latency requirements $b_k$, cable laying cost c, BU construction cost $c_b$, and the topology of Steiner tree.
Output:
  Coordinates of Steiner nodes S = {$s_i$}, i = 1, 2, . . . , n − 2, and the path of the Steiner tree, Γ
1:  Run FMM for each terminal node $x_i$, i = 1, 2, . . . , n, to obtain the corresponding level set (distance map) $d_i$;
2:  Obtain the coordinates of Steiner nodes S by executing the DAG-Least-Cost-System algorithm with the distance map $d_i$ and the given topology.
3:  for each constraint requirement $r_k$ do
4:    if $(l(\gamma_{k(x_i,x_j)}) - b_k) < 0$ then
5:      return ∅:
6:    end if
7:  end for
8:  Let $\lambda_k^0$, k = 1, . . . , |R|, equal to a large number which leads to a feasible solution S';
9:  Update the distance map $d_i$ according to the value of the λs associated with the constraints;
10: for i = 1, 2, . . . , n, do
11:   $\hat{\lambda} = 0$,
12:   for k = 1, 2, . . . , |R| do
13:     if node $x_i$ is one terminal of constraint $r_k$ then
14:       $\hat{\lambda} = \hat{\lambda} + \lambda_k$,
15:     end if
16:     $d_{x_i} = (1 + \hat{\lambda}) \cdot d_{x_i}$
17:   end for
18: end for
19: Obtain the coordinates of Steiner nodes S and corresponding $f_{LB}(S)$ by executing the DAG-Least-Cost-System algorithm with the distance map $d_i$ and the given topology.
20: while $\lambda_k \cdot g_k(S) \neq \lambda_k \cdot b_k$ & I ≤ $I_{max}$ do
21:   
$$\lambda_k^{I+1} = \lambda_k^I + \frac{1}{I} \cdot \frac{g_k(S^I) - b_k}{|g_k(S^I) - b_k|}, k = 1, \ldots, |R|;$$

22:   if f'(S) < $f_{LB}$(S') then
23:     $f_{LB}$(S') = f'(S);
24:     S' = S.
25:   end if
26:   I = I + 1;
27:   Obtain the coordinates of Steiner nodes S by executing the DAG-Least-Cost-System algorithm with the updated $d_i$ and the given topology.
28: end while
29: Obtain the optimal or soboptimal result with Steiner nodes S*;
30: Calculate the minimum cost T for this topology, T = f(S*) + $N_b \cdot c_b$;
31: return S, Γ and T.

---

In Algorithm 2, for the given topology, first calculate and determine the relationship between $l_{k(x_i,x_j)}$ and $b_k$. If one of $l_{k(x_i,x_j)} > b_k$, then there is no feasible solution for this topology. On the premise of $l_{k(x_i,x_j)} \leq b_k$, k=1,2, . . . , |R| for a given topology, LAFM-I starts with λs equal to values large enough to lead to a feasible solution, S', and its corresponding $f_{LB}$(S'). Then all λs are updated using Equation (9):

$$\lambda_k^{I+1} = \lambda_k^I + \frac{1}{I} \cdot \frac{g_k(S^I) - b_k}{|g_k(S^I) - b_k|}, \text{ if } g_k(S^I) \neq b_k \quad (9)$$

After every iteration, S' and $f_{LB}$(S') will be updated if the current f(S) is less and the constraints are satisfied. LAFM-II stops when $\lambda_k g_k(S) = \lambda_k b_k$, k=1, 2, . . . , |R|, or the maximum number of iterations $I_{max}$ is reached.

Based on the above, it can be determined that if LAFM-II outputs a solution within a predefined maximum number of iterations, then this solution is the optimal solution of the primal problem (3) since the complementary slackness condition is satisfied. However, in some instances, LAFM-II may not guarantee that the optimal solution of the primal problem (3) is found because of its complicated nature. If the 2D manifold is simply the 2D plane in problem (3), the conclusion may be strengthened since both f(s) and $g_k(s)$ are convex. Simulations based on LAFM-II show that, in many cases, LAFM-II obtains the optimal solution of problem (3). In some embodiments, in addition, the best bound for f(s) in the iteration of LAFM-II can be kept and used as an estimate of the optimal f(8) if LAFM-II does not find the most optimal one. The gap, denoted as $G_{l,u}$ between the upper and lower bounds of the optimal solution depends on the Lagrange multipliers and the difference from the real length of constraint path to the length requirement as shown in Equation (10):

$$G_{l,u} = \sum_{k=1}^{|R|} \lambda_k(g_k(S) - b_k(x_i, x_j)) \quad (10)$$

LAFM Method for Unknown Topology

The above embodiments are applicable for a set of terminal nodes with a given topology. The LAFM-I and LAFM-II algorithms in the above embodiments start with a known topology. Based on this topology, the number of the branching units and how these branching units connect with each other and terminals are known. The traffic requirements through each branching unit is known. These enable accurate estimation of the cost. In some embodiments, the algorithms can use different costs for different branching units. However, for an unknown topology problem, it would be necessary to consider all possible topologies for terminal nodes, including all full Steiner topologies (including degenerate topologies). In examples in which the topology is not specified, it may be necessary to consider all possible topologies, including all full Steiner topologies and their degenerate topologies. This is because, when considering the cost of branching unit, the full Steiner topologies with minimal total cable laying cost is not always or exactly the minimal cable system construction cost. The increase in the total cable length may result in a decrease in the number of branching units and hence possibly the total cost.

The process is generally as follows. First, list all possible full Steiner topologies in the 2D manifold by Smith's branch and bound (B&B) method such as that disclosed in W. D. Smith, "How to find Steiner minimal trees in Euclidean d-space," Algorithmica, vol. 7, no. 1, pp. 137-177, 1992. All degenerate topologies can be derived from the full Steiner topologies, in accordance with T. Wang, Z. Wang, B. Moran, and M. Zukerman, "*Submarine cable network design for regional connectivity,*" 2022, accepted for publication in IEEE/ACM Transactions on Networking; Earlier version is available in arXiv. [Online]. Available: https://arxiv.org/abs/2201.05802. Then, for every full Steiner topology, run Dijkstra's algorithm to find the internal nodes along the path between constraint pairs of nodes. Note: in some embodiments, when applying Dijkstra's algorithm, the weight of every path between two nodes is regarded as the same. Then, taking into account the number of internal nodes along the path, list all possible degenerate topologies.

Figure 4A:
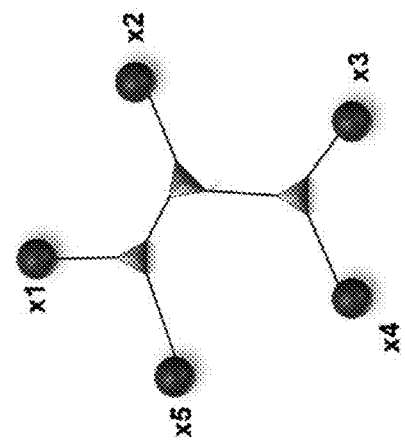
FIG. 4A is a schematic diagram illustrating a Steiner tree with one internal node along the constrained path (between nodes $x_1$ and $x_5$) in one example.
Figure 4B:
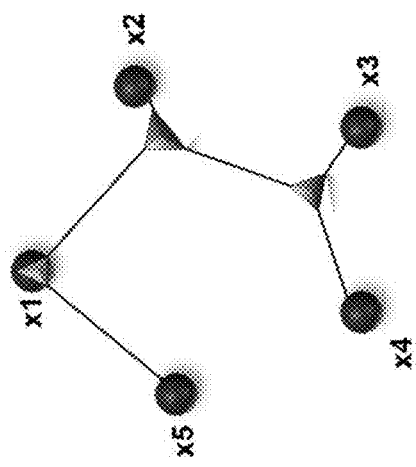
FIG. 4B is a schematic diagram illustrating a Steiner tree of a degenerated case of the Steiner tree of FIG. 4A.
Figure 4C:
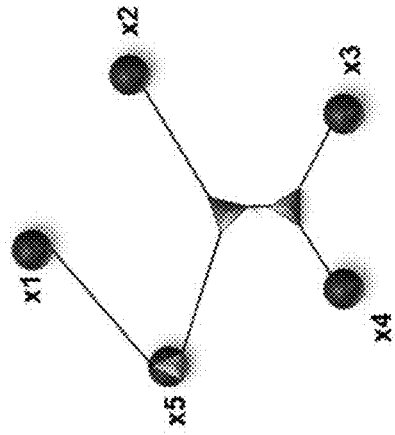
FIG. 4C is a schematic diagram illustrating a Steiner tree of a degenerated case of the Steiner tree of FIG. 4A.

The detailed enumeration principles are as follows:

(1) If there is one internal node along the constrained path as shown in FIG. 4A, the latency requirement is between nodes $x_1$ and $x_5$, the optimal solution can be obtained by applying LAFM for this topology. When branching unit cost is regarded as part of the total cable construction cost, as $\lambda$ changes, the number of branching units will reduce when the position of a Steiner node coincides with one of the constrained pair of nodes. So, there are two cases as shown in FIGS. 4B and 4C. For these two cases, the constrained pair of nodes $x_1$ and $x_5$ are already connected, so it is only necessary to run the dynamic programming for the remaining four nodes without considering the constraint requirement.

Figure 5C:
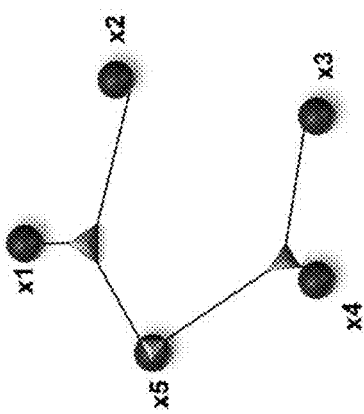
FIG. 5C is a schematic diagram illustrating a Steiner tree of a degenerated case of the Steiner tree of FIG. 5A.
Figure 5B:
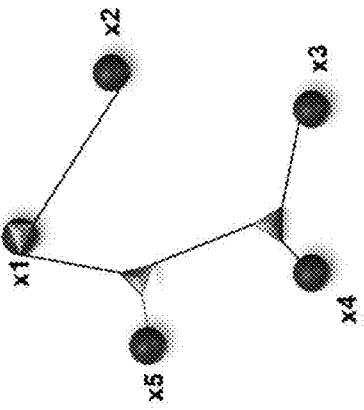
FIG. 5B is a schematic diagram illustrating a Steiner tree of a degenerated case of the Steiner tree of FIG. 5A.
Figure 5A:
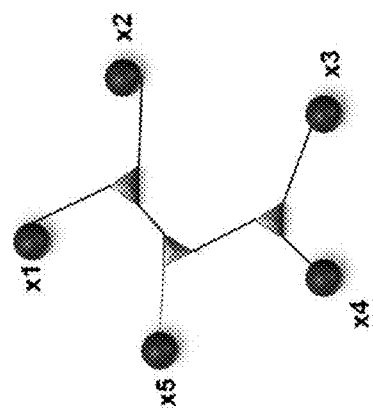
FIG. 5A is a schematic diagram illustrating a Steiner tree with two internal nodes along the constrained path (between nodes $x_1$ and $x_5$) in one example.
Figure 5F:
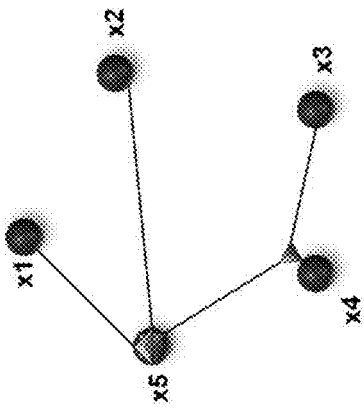
FIG. 5F is a schematic diagram illustrating a Steiner tree of a degenerated case of the Steiner tree of FIG. 5A.
Figure 5E:
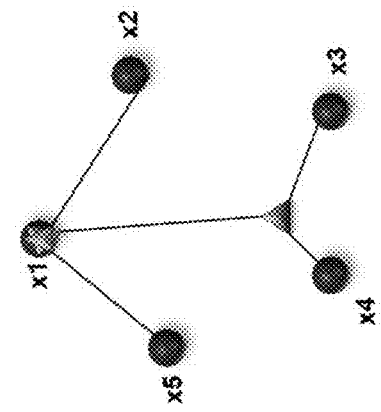
FIG. 5E is a schematic diagram illustrating a Steiner tree of a degenerated case of the Steiner tree of FIG. 5A.
Figure 5D:
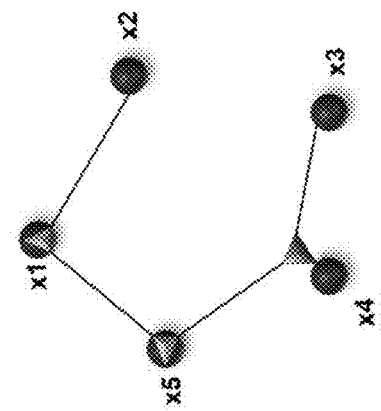
FIG. 5D is a schematic diagram illustrating a Steiner tree of a degenerated case of the Steiner tree of FIG. 5A.

(2) If there are two internal nodes along the constrained path as shown in FIG. 5A, then, as $\lambda$ changes, the number of branching units may reduce. There are five cases, as shown in FIGS. 5B-5F.

Figure 6C:
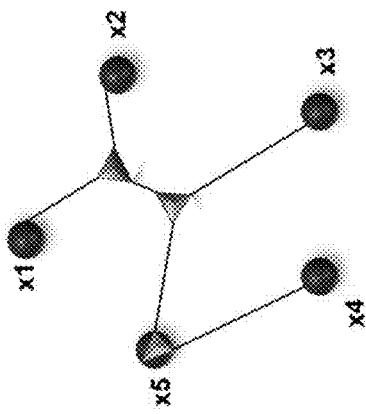
FIG. 6C is a schematic diagram illustrating a Steiner tree of a degenerated case of the Steiner tree of FIG. 6A.
Figure 6B:
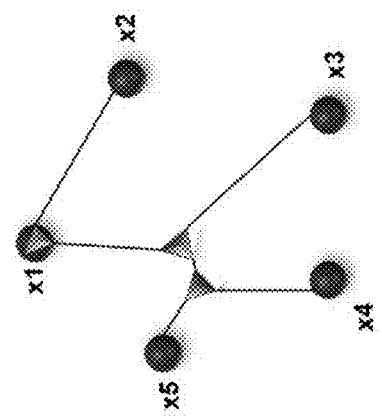
FIG. 6B is a schematic diagram illustrating a Steiner tree of a degenerated case of the Steiner tree of FIG. 6A.
Figure 6A:
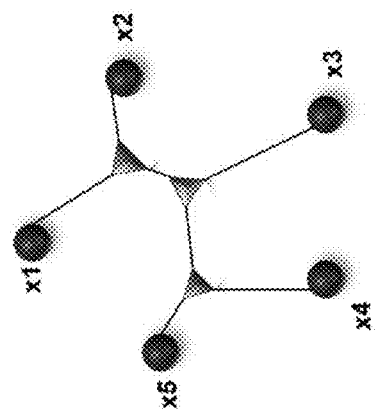
FIG. 6A is a schematic diagram illustrating a Steiner tree with three internal nodes along the constrained path (between nodes $x_1$ and $x_5$) in one example.
Figure 6F:
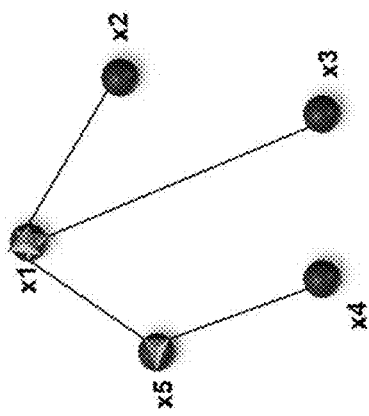
FIG. 6F is a schematic diagram illustrating a Steiner tree of a degenerated case of the Steiner tree of FIG. 6A.
Figure 6E:
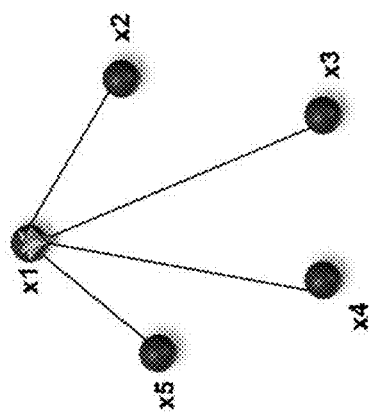
FIG. 6E is a schematic diagram illustrating a Steiner tree of a degenerated case of the Steiner tree of FIG. 6A.
Figure 6D:
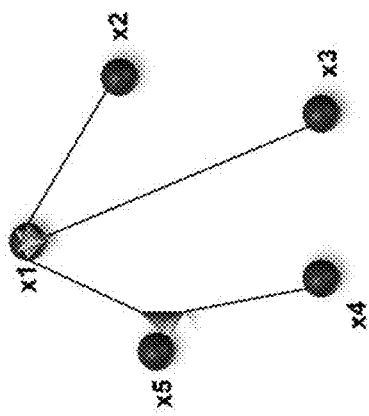
FIG. 6D is a schematic diagram illustrating a Steiner tree of a degenerated case of the Steiner tree of FIG. 6A.
Figure 6I:
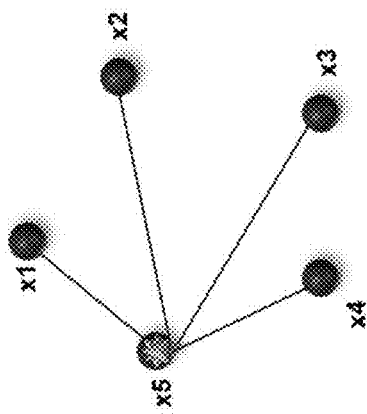
FIG. 6I is a schematic diagram illustrating a Steiner tree of a degenerated case of the Steiner tree of FIG. 6A.
Figure 6H:
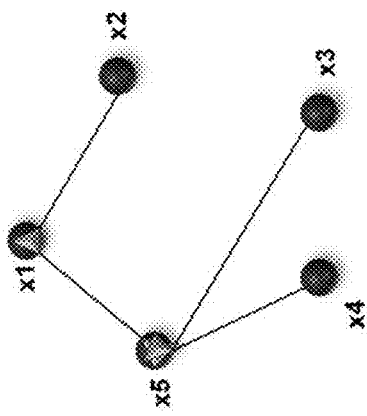
FIG. 6H is a schematic diagram illustrating a Steiner tree of a degenerated case of the Steiner tree of FIG. 6A.
Figure 6G:
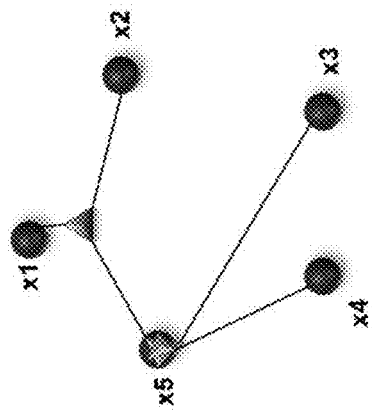
FIG. 6G is a schematic diagram illustrating a Steiner tree of a degenerated case of the Steiner tree of FIG. 6A.

(3) If there are three internal nodes along the constrained path as shown in FIG. 6A, a similar analysis to the two internal nodes case reveals that, for three internal nodes topologies, there are eight cases as shown in FIGS. 6B-6I.

Based on the above, if there are n internal nodes on the path between constrained pair of nodes, there will be $3n$ different topologies, including the original full Steiner case, because of the various combinations of Steiner nodes and terminal nodes. It is noted that in some embodiments the topologies in FIGS. 5D-5F do not need to be considered as they will inevitably lead to solutions that are no better than the topologies in FIGS. 4A-4C.

Note that, when the constrained pair of nodes $x_1$ and $x_5$, are directly connected, it is only necessary to apply the FMM method to optimize the path between nodes $x_1$ and $x_5$, and run the dynamic programming algorithm for DAG-Least-Cost-System for the remaining four nodes without considering the constraint requirement.

For each topology, the LAFM method, the dynamic programming algorithm for DAG-Least-Cost-System, and the FMM method (for point-to-point distance calculation) are respectively applied to calculate the total cost of the cable system, and the smallest total cost is chosen.

Computational Complexity Analysis of LAFM

As the SMT problem is NP-hard, the following derives the computational requirement of one iteration for a given topology. Assume $|H|$ grid nodes on the area $\mathbb{M}$ and N terminals to be connected. The complexity analysis is then the same as in Z. Wang, Q. Wang, B. Moran, and M. Zukerman, "*Optimal submarine cable path planning and trunk-and-branch tree network topology design,*" IEEE/ACM Transactions on Networking, vol. 28, no. 4, pp. 1562-1572 August 2020 and T. Wang, Z. Wang, B. Moran, and M. Zukerman, "*Submarine cable network design for*

*regional connectivity,"* 2022, accepted for publication in IEEE/ACM Transactions on Networking; Earlier version is available in arXiv. [Online]. Available: https://arxiv.org/abs/2201.05802: for a given topology with No Steiner nodes, the computational complexity of every iteration is $O(|H|^2 (\log|H|+N_b-1))$. The running time of the LAFM algorithm depends on the setting of the initial value of $\lambda$ and the allowable tolerance range resolution. The cost for each pair of grid nodes on the manifold $\mathbb{M}$ is computed and stored in a database. Therefore, in the worst case, the algorithm requires at least $O(|H|^2)$ of memory.

Numerical Results

Figure 7:
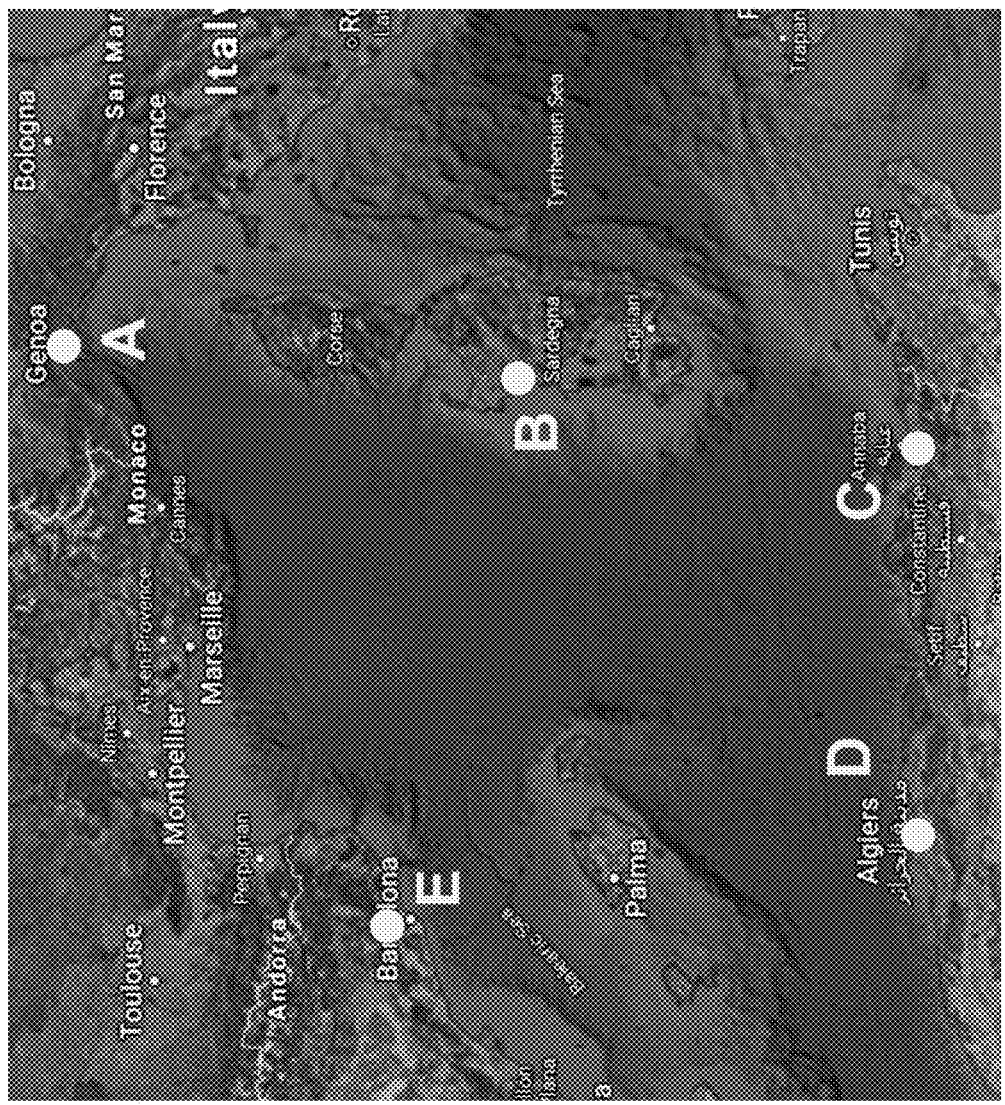
FIG. 7 is a map illustrating a geographic terrain of a region of interest (with 5 locations of interest) in one example.

The above methods are applied to three realistic examples using bathymetric data with 30 arc-second increments in longitude and latitude from the Global Multi-Resolution Topography synthesis. The object region $\mathbb{D}$ for the three examples spans from the northwest corner (45.000°N, 0.000° E) to the southeast corner (36.000°N, 11.000° E). There are five terminal nodes in this area as shown in FIG. 7: Marseille (43.297°N, 5.359°E), Sardegna (40.557°N, 8.312°E), Algiers (36.761°N, 3.074°E), Barcelona (41.368°N, 2.190° E), and Annaba (36.928°N, 7.760° E), which are denoted as A, B, C, D, E, respectively. In these examples, the branching unit cost is considered to be $1 million. In this example, to simplify the exposition, it is assembled that only the cable length and the cable location on the seabed affects the objective function cost. The inventors of the invention have devised, through research, experiments, and trials, that the length of the cable should be as short as possible in shallow water, except in the area close to the cable landing station. The cable should preferably be laid deep in the sea, thereby reducing the risks posed by human activities. As the depth of cable laying areas increases, the threat of cable failure decreases. The design of Equation (11) and the selection of parameters can be based on a cable engineer's suggestion. It should be noted that Equation (11) is not absolute and can be adjusted according to different actual situations, and such adjustment would have no impact on the applicability of the algorithms of the embodiments of the invention.

The depth, denoted by z, is considered in the objective cost function in units of USD $.

$$c(x) = \begin{cases} 37500, & \text{if } z \geq 0 \text{ km,} \\ 25000 - 25000 \times |z|, & \text{if } 0 \text{ km} > z \geq -0.2 \text{ km,} \\ \dfrac{8000}{|z| + 0.2}, & \text{otherwise} \end{cases} \quad (11)$$

where x is a mesh node and c(x) is the cost of cable per km at mesh node x.

The LAFM-I and LAFM-II algorithms in the above embodiments are run for all possible solutions, according to whether the problem involved a single latency constraint or multiple latency constraints, based on a resolution of about 7.48 km, to decide the location of the Steiner nodes and the cable path. For comparison, a Simulated Annealing (SA) algorithm is applied to design submarine communication cable paths under a single latency constraint as well as multiple latency constraints based on the same resolution.

Exemplary details of the SA algorithm can be found in: P. J. Van Laarhoven and E. H. Aarts, "Simulated annealing," in *Simulated Annealing: Theory and Applications*. Springer, 1987, pp. 7-15, D. Bertsimas and J. Tsitsiklis, "Simulated annealing," *Statistical Science*, vol. 8, no. 1, pp. 10-15, 1993, P. C. Schuur, "Classification of acceptance criteria for the simulated annealing algorithm," *Mathematics of Operations Research*, vol. 22, no. 2, pp. 266-275, 1997, J. Haddock and J. Mittenthal, "Simulation optimization using simulated annealing," *Computers & Industrial Engineering*, vol. 22, no. 4, pp. 387-395, 1992, S. Kirkpatrick, C. D. Gelatt, and M. P. Vecchi, "Optimization by simulated annealing," *Science*, vol. 220, no. 4598, pp. 671-680, 1983. The SA algorithm applied in the comparison in shown in Algorithm 3.

| Algorithm 3 The SA algorithm. | |
|---|---|
| Input: | |
| | Given topology and m initial BU locationa $B_o :=$ $\{B_m(x_m, y_m)\}$ where $x_m$ and $y_m$ are the longitude and latitude of BU $B_m$, latency constraints, initial temperature $T_0$, termination temperature $T_f$, maximal number of iterations $L_M^{T(k)}$ at temperature $T(k)$, temperature attenuation function $T(k)$ with the cooling time k, maximum variation for BU locations $L_{arc}$. |
| Output: | |
| | $B_{best} := \{B_m\}$ that provides paths connecting all the nodes with minimal total cost and meets all the latency requirements at the same time. |
| 1: | Connect all the nodes and BUs according to the given topology; |
| 2: | k=1, $B_{current} = B_0$; |
| 3: | Calculate current total cost $C_{current}$; |
| 4: | while $T(k) > T_f$ do |
| 5: |    for $i = 1,...,L_M^{T(k)}$ do |
| 6: |       for $j = 1,...,m$ do |
| 7: |          $\alpha \sim U(-1, 1), \beta \sim U(-1, 1)$; |
| 8: |          $x_m = x_m + \alpha \cdot L_{arc}$; |
| 9: |          $y_m = y_m + \beta \cdot L_{arc}$; |
| 10: |       end for |
| 11: |       Connect all the nodes and BUs according to the given topology; |
| 12: |       if All the paths meet the latency requirements then |
| 13: |          $B_{new} := \{B_m(x_m, y_m)\}$; |
| 14: |          Calculate new total cost $C_{new}$; |
| 15: |          if $C_{new} < C_{current}$ then |
| 16: |             $C_{current} = C_{new}, B_{current} = B_{new}$; |
| 17: |             if $C_{new} < C_{best}$ then |
| 18: |                $C_{best} = C_{new}, B_{best} = B_{new}$; |
| 19: |             end if |
| 20: |          else |
| 21: |             $\sigma \sim U(0, 1)$; |
| 22: |             if $\sigma < e^{-(C_{new}-C_{current})/T(1)}$ then |
| 23: |                $C_{current} = C_{new}, B_{current} = B_{new}$; |
| 24: |             else |
| 25: |                $B_{new} = B_{current}$; |
| 26: |             end if |
| 27: |          end if |
| 28: |       end if |
| 29: |    end for |
| 30: |    k = k + 1; |
| 31: | end while |
| 32: | return $B_{best}$. |

In more detail, for comparison, simulated annealing is applied to optimize submarine cable paths under latency requirements. Under the premise of a given topology, SA is used to obtain the positions $B_0$, $B_0 := \{B_m(x_m; y_m):m=1, 2, \ldots, N_b\}$ of the branching units, where $x_m$ and $y_m$ are the longitude and latitude of the mth branching unit, respectively.

SA is a technique that simulates a physical process of heating a material, and then slowly lowering the temperature to reduce defects, resulting in the system falling into a minimal energy state. Kirkpatrick et al. (referenced above) has shown that system energy can model the cost function of certain combinatorial optimization problems (e.g., the traveling salesperson problem), where seeking the lowest cost is equivalent to seeking the lowest energy. Accordingly, the SA algorithm is developed based on the Metropolis algorithm and used for optimization problems. At iteration i, a new solution $x_i+1$ is generated from the current one $x_i$ according to a distribution over a neighborhood of $x_i$ that provides a tendency towards a better solution. This distribution is parametrized by the temperature parameter T. When T is large, the distribution is more diffuse. Over the iterations, indexed by k, the temperature is decreased according to an annealing schedule: $T=T_0>T_1>T_2> \ldots >T_k> \ldots$ . In typical applications, the algorithm accepts an updated solution $x_i+1$ if it improves the value of the objective function, but also with a certain, temperature-dependent probability, the algorithm accepts solutions that worsen the objective value. Under the right temperature schedule, accepting solutions that make the objective worse allows the algorithm to avoid falling into and remaining in local minima and explore more possible solutions globally. In an example, an annealing schedule is designed to lower the temperature as SA proceeds systematically. The system temperature gradually decreases as the algorithm continues, and the search range for solutions is reduced to converge to a minimum. Under certain kinds of annealing schedules and for many problems, convergence is effectively guaranteed.

In an example, the temperature is constant over a number of iterations before reducing it. Two iteration indexes are used: the cooling time index k, and the execution index i. The termination temperature is presented as $T_f$. As the SA algorithm goes on, the temperature will decrease according to $$T(k) = \frac{T_0}{1 + \log(1+k)}$$

with the cooling time k. The maximal number of iterations (indexed by i) at temperature T(k) is denoted by $L_M^{T(k)}$.

In every iteration, one of the branching unit is chosen randomly and its longitude and latitude is updated. According to the new location of branching units, calculate the current total cost $C_{current}$ and the length of the paths with latency requirements. If all the paths meet the latency requirements limitation and the current total cost $C_{current}$ is less than the best-recorded solution $B_{best}$, update the best solution. Otherwise, if the new locations increase the total cost, these locations will be accepted with a certain probability $P=-C^{-\Delta/T(k)}$ according to the Metropolis criterion, where T(k) is the current temperature and $\Delta$ is the deviation which is equal to previous total cost minus new total cost.

SA stops when the current temperature reaches $T_f$. During the execution of the SA algorithm, the slower the temperature cooling and using more iterations, the more likely it is to find the global optimal solution.

In some implementations of the invention, for a single constraint problem, as LAFM-I is proved to be optimal, it can be used as a benchmark to assess the performance of SA. On the other hand, for multiple constraint problems, the results of the two approaches are compared and the better result is chosen as the final result. The comparison demonstrates two cases of two and four latency constraints where LAFM-II can provide optimal solutions, and has shown that LAFM-II outperforms SA in these two cases. The experiments based on the LAFM algorithms in these embodiments are run on a platform with a 2.00 GHz Intel Core i5 CPU while the experiments based on SA are run on a platform with a 2.60 GHz Intel Core i7-9750H CPU.

Example with One Latency Requirement

In one example, the aim is to find a cable system at minimum cost connecting the five terminal nodes in FIG. 7, where cost is defined as the total cost of the cable system including branching unit construction cost and cable laying cost, and there is a latency requirement between nodes A and E ($l_{A,E} \leq 500$ km).

Figure 8C:
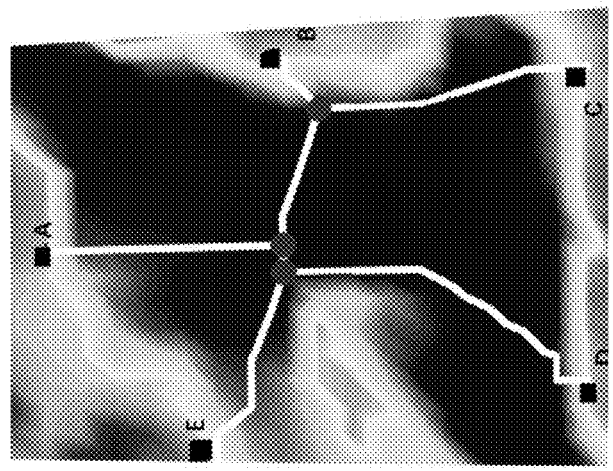
FIG. 8C is a schematic diagram of a five-terminal cable system with a third full Steiner topology for the region of interest in FIG. 7 in one embodiment.
Figure 9B:
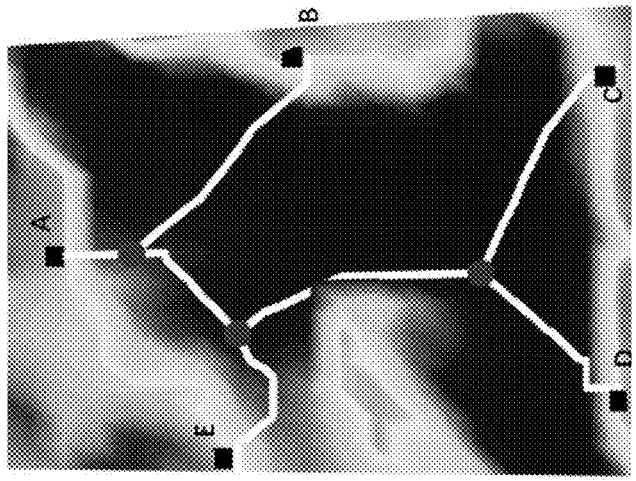
FIG. 9B is a schematic diagram illustrating an optimization result (with one constraint, with two Steiner nodes along the constrained path) of the optimization process illustrated in FIG. 9A.
Figure 9A:
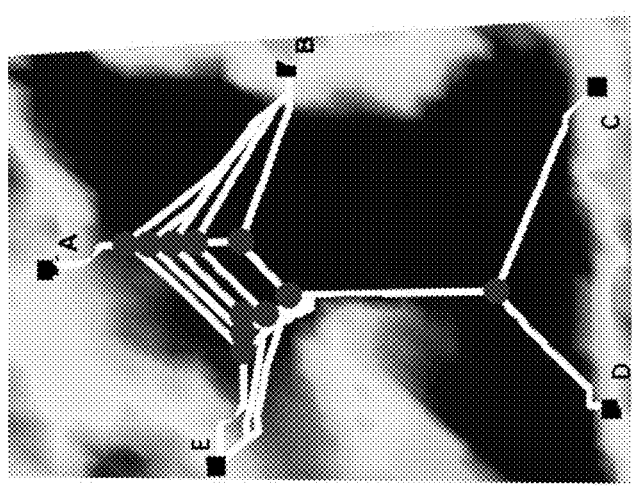
FIG. 9A is a schematic diagram illustrating an optimization process (with one constraint) for the first topology of FIG. 8A using a Lagrangian fast marching algorithm (LAFM-I) in one embodiment.
Figure 10B:
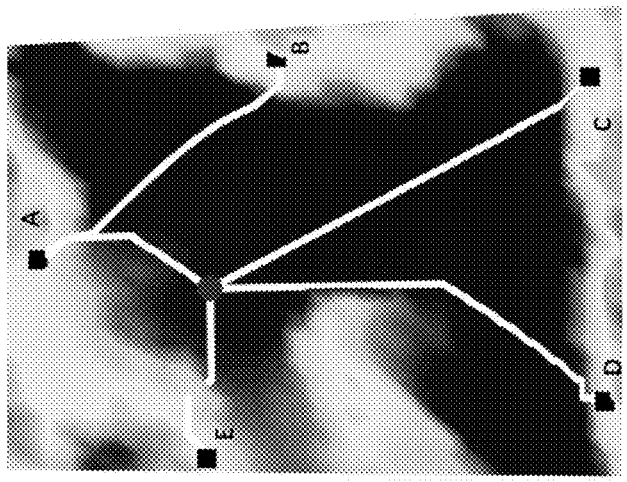
FIG. 10B is a schematic diagram illustrating an optimization result obtained for a degenerated case of the first topology of FIG. 8A (with one constraint, with one Steiner node along the constrained path) using a Lagrangian fast marching algorithm (LAFM-I) in one embodiment.
Figure 10A:
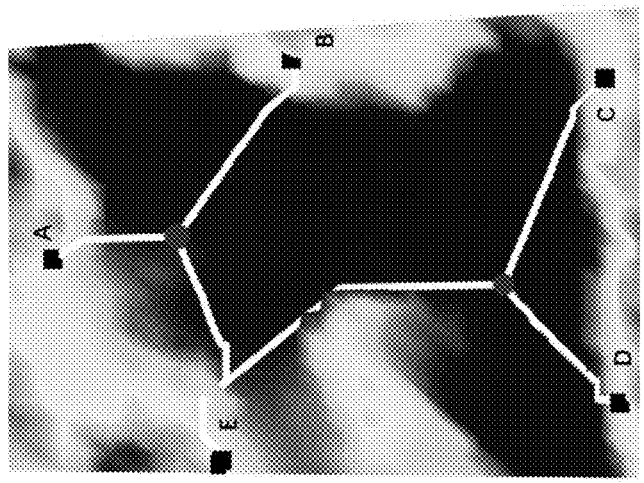
FIG. 10A is a schematic diagram illustrating an optimization result obtained for a degenerated case of the first topology of FIG. 8A (with one constraint, with one Steiner node along the constrained path) using a Lagrangian fast marching algorithm (LAFM-I) in one embodiment.
Figure 11B:
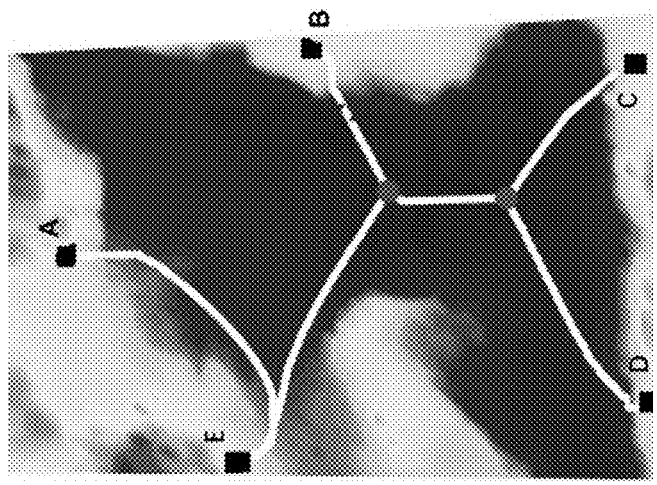
FIG. 11B is a schematic diagram illustrating an optimization result obtained for a degenerated case of the first topology of FIG. 8A (with one constraint, with no Steiner node along the constrained path) using a Lagrangian fast marching algorithm (LAFM-I) in one embodiment.
Figure 11A:
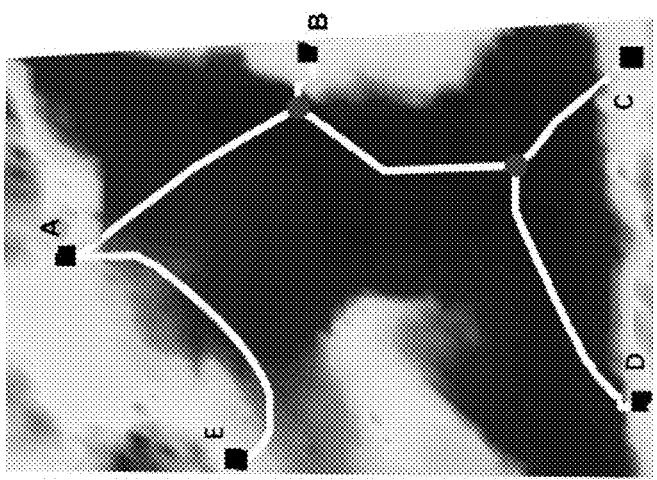
FIG. 11A is a schematic diagram illustrating an optimization result obtained for a degenerated case of the first topology of FIG. 8A (with one constraint, with no Steiner node along the constrained path) using a Lagrangian fast marching algorithm (LAFM-I) in one embodiment.

For five terminals, there are fifteen full Steiner topologies. Based on engineering experience, cross-laying of cables is avoided thus the five topologies shown in FIGS. 8A-8E can cover all realistic topologies for these five terminals. The process of finding the optimal SMT with topology I is shown in FIG. 9A. The process begins at a feasible but not optimal solution with λ=20. As λ is updated at every iteration, the location of the Steiner nodes moves to make the length of the path between nodes A and E closer to the 500 km cable length requirement. LAFM-I stops when $I>I_{max}(I_{max}=100)$ with the result shown in FIG. 9B. It takes about 5.5 hours to execute LAFM-I for a specific topology once. This is just for topology I with two Steiner nodes between nodes A and E. However, as λ changes, the number of Steiner nodes between nodes A and E may change. So, it is necessary to apply the LAFM-I algorithm for different topologies with different numbers of Steiner nodes between nodes A and E. For Topology I, if the number of branching units along the constrained path decreases by one (as one of the Steiner nodes coincides with node A or node E), there will be two cases to be considered. The optimal results for these two cases are shown in FIGS. 10A-10B. If nodes A and E are connected directly without a branching unit along the path, according to the discussion in Section IV, there are two cases as shown in FIGS. 11A-11B. This includes all degenerate topologies in which nodes A and E are connected directly: a cable system without constraint consists of nodes A, B, C, D; and a cable path connects A and E directly, as shown in FIG. 11A; and a cable system without constraint consists of nodes E, B, C, D, and a cable path connects A and E directly, as shown in FIG. 11B.

Figure 8B:
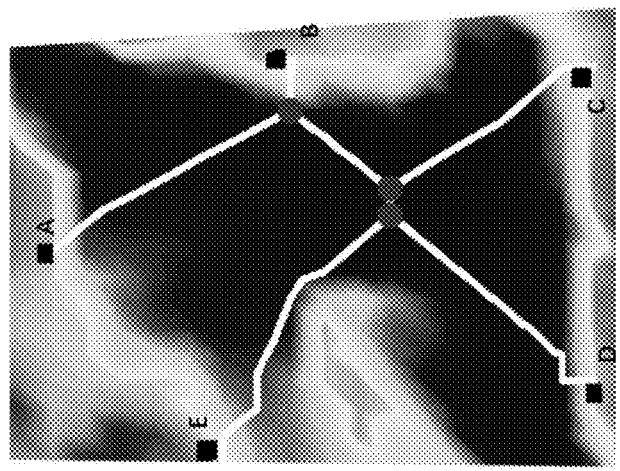
FIG. 8B is a schematic diagram of a five-terminal cable system with a second full Steiner topology for the region of interest in FIG. 7 in one embodiment.
Figure 8A:
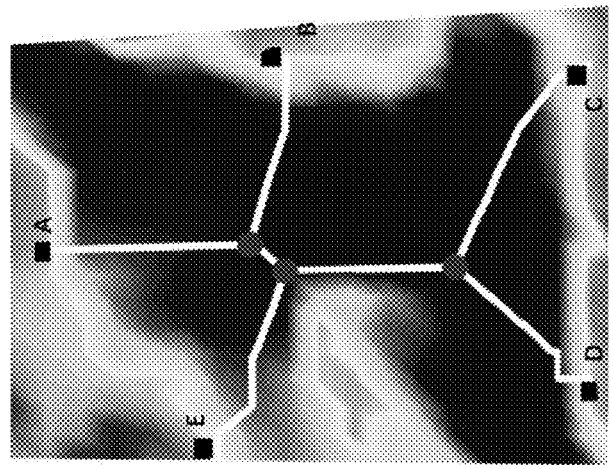
FIG. 8A is a schematic diagram of a five-terminal cable system with a first full Steiner topology for the region of interest in FIG. 7 in one embodiment.
Figure 12A:
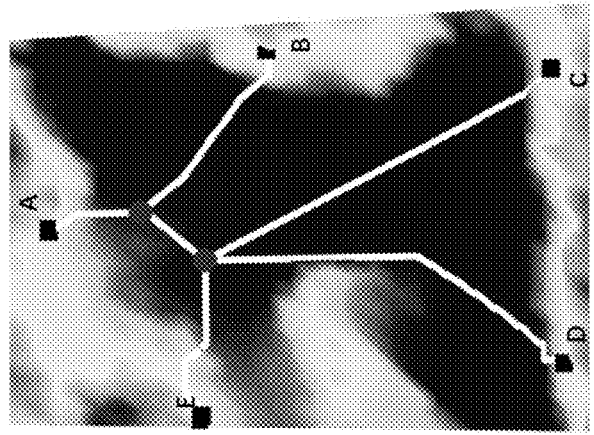
FIG. 12A is a schematic diagram illustrating an optimization result obtained for the second topology of FIG. 8B (with one constraint, with three Steiner nodes along the constrained path) using a Lagrangian fast marching algorithm (LAFM-I) in one embodiment.
Figure 12B:
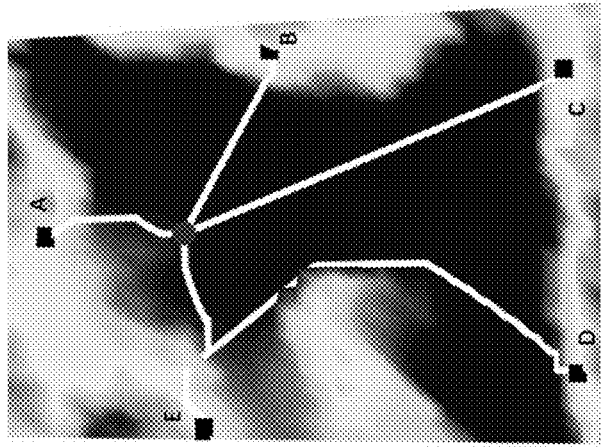
FIG. 12B is a schematic diagram illustrating an optimization result obtained for a degenerated case of the second topology of FIG. 8B (with one constraint, with two Steiner nodes along the constrained path) using a Lagrangian fast marching algorithm (LAFM-I) in one embodiment.
Figure 12C:
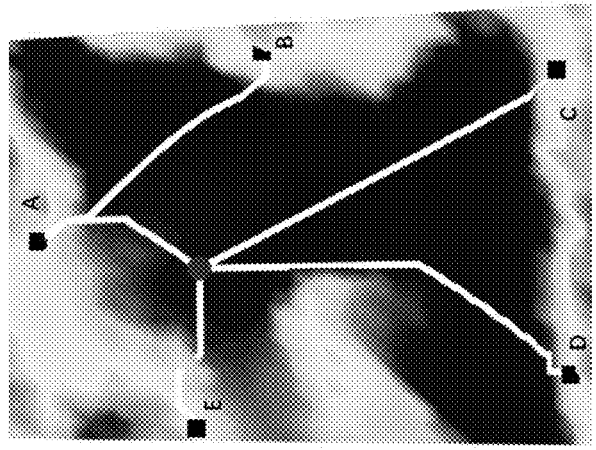
FIG. 12C is a schematic diagram illustrating an optimization result obtained for a degenerated case of the second topology of FIG. 8B (with one constraint, with two Steiner nodes along the constrained path) using a Lagrangian fast marching algorithm (LAFM-I) in one embodiment.
Figure 12F:
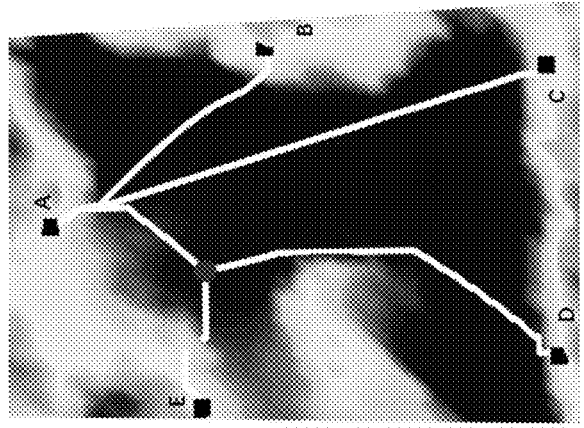
FIG. 12F is a schematic diagram illustrating an optimization result obtained for a degenerated case of the second topology of FIG. 8B (with one constraint, with one Steiner node along the constrained path) using a Lagrangian fast marching algorithm (LAFM-I) in one embodiment.
Figure 12E:
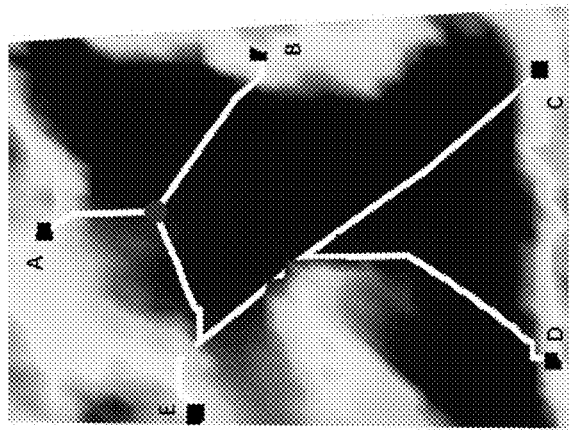
FIG. 12E is a schematic diagram illustrating an optimization result obtained for a degenerated case of the second topology of FIG. 8B (with one constraint, with one Steiner node along the constrained path) using a Lagrangian fast marching algorithm (LAFM-1) in one embodiment.
Figure 12D:
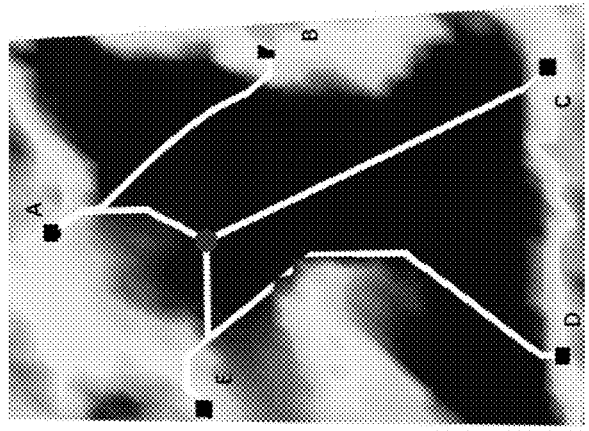
FIG. 12D is a schematic diagram illustrating an optimization result obtained for a degenerated case of the second topology of FIG. 8B (with one constraint, with one Steiner node along the constrained path) using a Lagrangian fast marching algorithm (LAFM-I) in one embodiment.

For Topology II shown in FIG. 8B, the corresponding six cases shown in FIGS. 12A-12F are compared. FIG. 12A provides the optimal result for the case where there are three branching units along the path between nodes A and E; FIGS. 12B-12C provide the optimal results for the two cases where there are two branching units along the path between nodes A and E. As one of the Steiner nodes is driven to coincide with node A (in the first case) or with node E (in the second case), this case is reduced to the case shown in FIGS. 12D-12F, thus providing an optimal result with only one branching unit along the path between nodes A and E. For the case where there is no branching unit along the path between nodes A and E, the results correspond to the topologies in FIGS. 11A-11B.

Figure 13B:
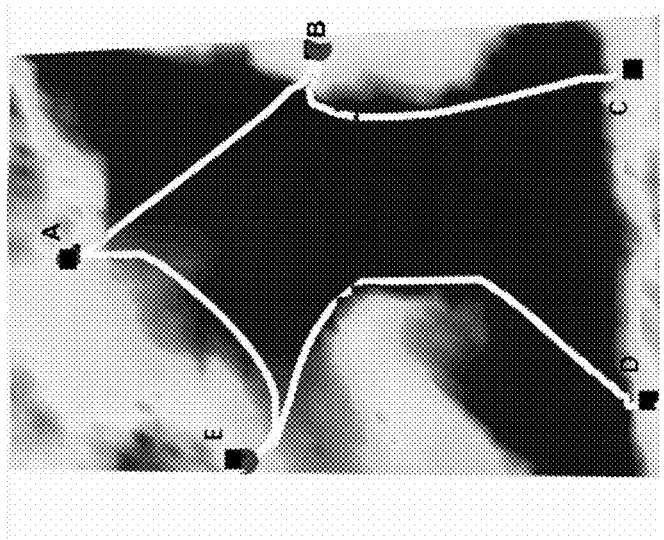
FIG. 13B is a schematic diagram illustrating an optimization result obtained for a degenerated case of the third topology of FIG. 8C (with one constraint, with one Steiner node along the constrained path) using a Lagrangian fast marching algorithm (LAFM-I) in one embodiment.
Figure 13A:
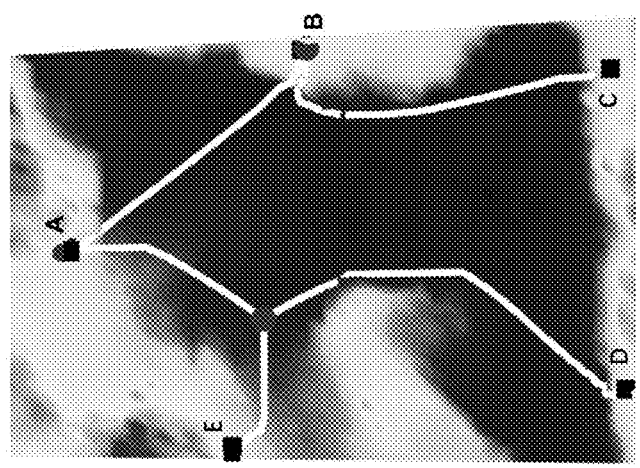
FIG. 13A is a schematic diagram illustrating an optimization result obtained for a degenerated case of the third topology of FIG. 8C (with one constraint, with one Steiner node along the constrained path) using a Lagrangian fast marching algorithm (LAFM-I) in one embodiment.

For Topology III shown in FIG. 8C, the degenerate topologies with one Steiner node along the constraint path are shown in FIGS. 13A-13B.

Figure 8E:
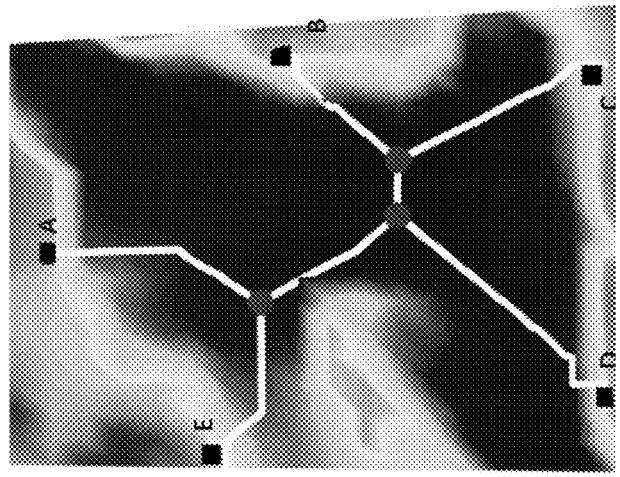
FIG. 8E is a schematic diagram of a five-terminal cable system with a fifth full Steiner topology for the region of interest in FIG. 7 in one embodiment.
Figure 8D:
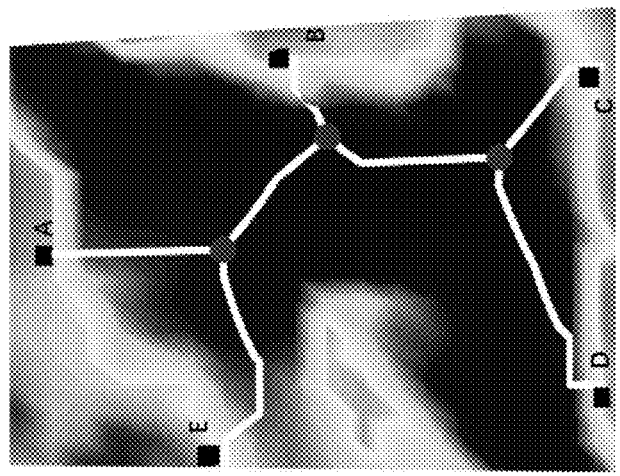
FIG. 8D is a schematic diagram of a five-terminal cable system with a fourth full Steiner topology for the region of interest in FIG. 7 in one embodiment.
Figure 14B:
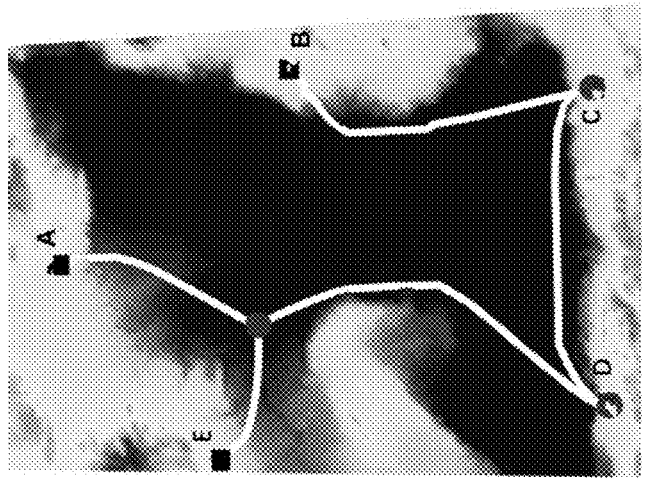
FIG. 14B is a schematic diagram illustrating an optimization result (with one constraint) obtained for the fifth topology of FIG. 8E using a Lagrangian fast marching algorithm (LAFM-I) in one embodiment.
Figure 14A:
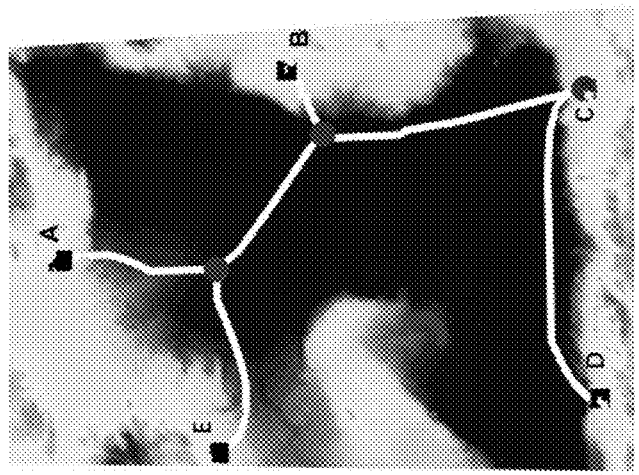
FIG. 14A is a schematic diagram illustrating an optimization result (with one constraint) obtained for the fourth topology of FIG. 8D using a Lagrangian fast marching algorithm (LAFM-I) in one embodiment.

The final best results for Topology IV and Topology V shown in FIGS. 8D and 8E are presented in FIGS. 14A and 14B. The resulting cases forming the degenerate cases of these two topologies can be found in the degenerate cases for Topologies I-III discussed above.

Finally, the results generated from the five possible full Steiner topologies are included in Table I. By comparing all these results, the optimal outcome obtained for this example is shown in FIG. 14A, with a total cost of $9.61 million and two branching units located at (41.5887°N, 4.8801°E) and (40.0425° N, 7.2556° E).

TABLE I

The SMT results for different topologies

| Topology | BU number along the path | $l_{A,E}$ (km) | BU number in the system | total length (km) | total cost (million $) | FIG. |
|---|---|---|---|---|---|---|
| Topology I | 2 | 482.62 | 3 | 1781.09 | 9.72 | 9B |
|  | 1 | 487.08 | 2 | 1769.95 | 10.13 | 10A |
|  | 1 | 485.20 | 2 | 2006.86 | 11.08 | 10B |
|  | 0 | 490.22 | 2 | 1876.54 | 9.96 | 11A |
|  | 0 | 490.22 | 2 | 1900.71 | 10.54 | 11B |
| Topology II | 3 | 488.87 | 3 | 1900.84 | 11.32 | 12A |
|  | 2 | 494.76 | 2 | 2450.20 | 11.17 | 12B |
|  | 2 | 485.20 | 2 | 2006.86 | 10.68 | 12C |
|  | 1 | 498.43 | 1 | 2565.55 | 10.54 | 12D |
|  | 1 | 488.21 | 1 | 2228.17 | 10.33 | 12E |
|  | 1 | 473.98 | 1 | 2179.89 | 10.04 | 12F |

TABLE I-continued

The SMT results for different topologies

| Topology | BU number along the path | $l_{A,E}$ (km) | BU number in the system | total length (km) | total cost (million $) | FIG. |
|---|---|---|---|---|---|---|
| Topology III | 1 | 485.20 | 1 | 1802.11 | 10.26 | 13A |
|  | 0 | 490.22 | 0 | 1906.79 | 9.75 | 13B |
| Topology IV | 1 | 446.69 | 2 | 1670.37 | 9.61 | 8D |
| Topology V | 1 | 482.89 | 1 | 1950.38 | 9.67 | 8E |

Multiple Latency Requirements

In some examples, LAFM-II is applied to solve the optimization problem for a cable system with multiple constraints and its performance is compared the performance of SA.

In one example, the aim is to find a Steiner tree with minimum cost to connect the five terminal nodes, satisfying two latency requirements between two pairs of nodes, (A, E) and (B, C), with the constraints $l_{A,E} \leq 450$ km and $l_{B,C} \leq 510$ km, respectively.

For multiple latency requirements problems, the possible topologies for these terminals are easier to eliminate, so simplifying the selection process of the topological structure and reducing the amount of calculation. For the five full Steiner typologies shown in FIGS. 8A-8E, the optimal result is generated from the topologies in FIG. 8D or 8E.

Figure 15C:
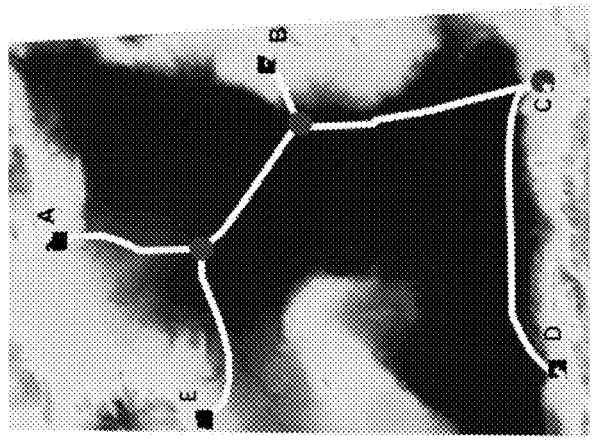
FIG. 15C is a schematic diagram illustrating an optimization result (with two constraints, with two Steiner nodes along the constrained path) of the optimization process illustrated in FIG. 15B.
Figure 15B:
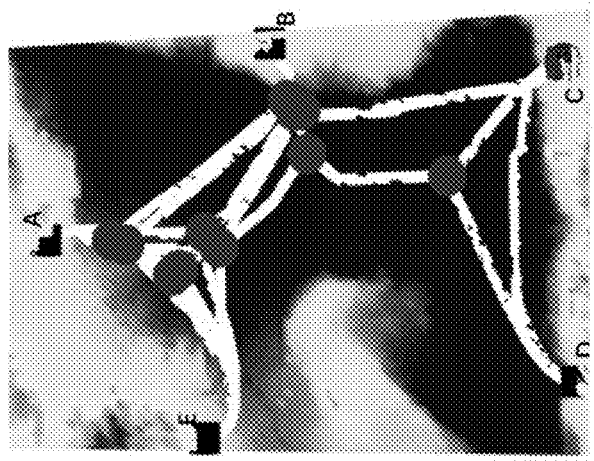
FIG. 15B is a schematic diagram illustrating an optimization process (with two constraints) obtained for the fourth topology of FIG. 8D using a Lagrangian fast marching algorithm (LAFM-II) in one embodiment.
Figure 15A:
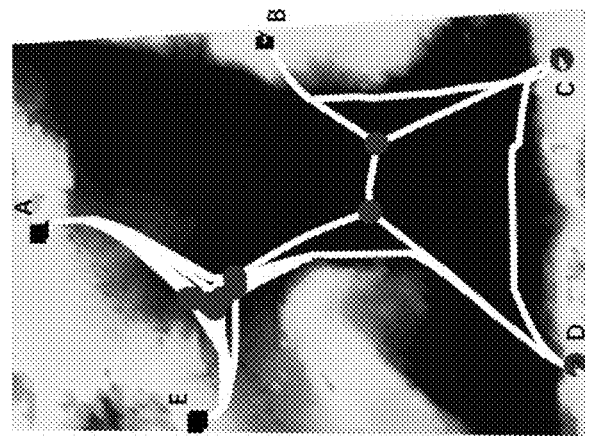
FIG. 15A is a schematic diagram illustrating an optimization process (with two constraints) obtained for the fifth topology of FIG. 8E using a Lagrangian fast marching algorithm (LAFM-II) in one embodiment.

The process of obtaining the optimal solution based on the topology in FIG. 8D is shown in FIG. 15B. LAFM-II begins at a feasible but not optimal solution with $\lambda_1=10$ and $\lambda_2=10$. Then, $\lambda_1$ and $\lambda_2$ are updated in every iteration according to Equation (8). LAFM-II stops when $\lambda_1=0.735$ and $\lambda_2=0$. The length of the cable path between nodes A and E is 446.699 km which can be regarded the same as the required length considering the resolution of 7.48 km. The length of the cable path between nodes B and C is 464.433 km which satisfies the requirement with $\lambda_2=0$. This solution is considered as an approximate optimal solution ($G_{l,u}=0$), resulting in a total cost of $9.61 million and a total length of 1670.373 km. It takes about 4.5 hours to execute LAFM-II for this topology. The process of getting the optimal solution based on the topology in FIG. 8E is shown in FIG. 15A. LAFM-II stops when $I > I_{max} (I_{max}=100)$ resulting in a total cost of $10.83 million and a total length of 1873.13 km. It takes about 6.5 hours to execute LAFM-II for this topology.

After comparison, the final result for this two constraint problem is the one based on the topology in FIG. 8D as shown in FIG. 15C with two branching units located at (41.5887°N, 4.8801°E) and (40.0425°N, 7.2556°E). Table II shows the details of the approximate optimal solution.

TABLE II

The final SMT result with two constraints

| Topology | Requirements | Constrained length | $\lambda_s$ | BU number | total length | total cost (million $) | FIG. |
|---|---|---|---|---|---|---|---|
| Topology V | $l_{A,E} \leq 450$ km | $l_{A,E} = 446.59$ km | $\lambda_1 = 0.735$ | 2 | 1670.37 km | 9.61 | 15C |
|  | $l_{B,D} \leq 510$ km | $l_{B,D} = 464.43$ km | $\lambda_2 = 0$ |  |  |  |  |

Figure 16:
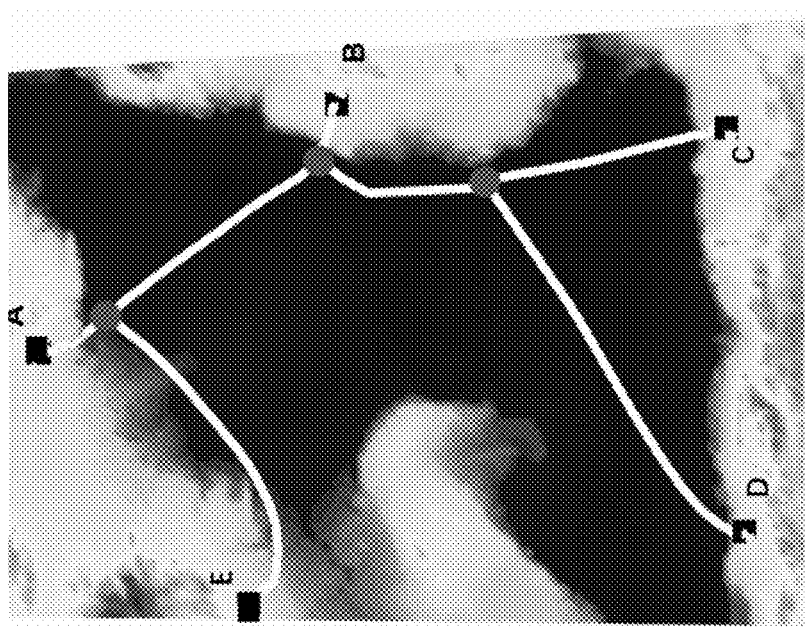
FIG. 16 is a schematic diagram illustrating an optimization result obtained for the fourth topology of FIG. 8D (with four constraints) using a Lagrangian fast marching algorithm (LAFM-II) in one embodiment.

In another example, the aim is to find a Steiner tree with minimum cost to connect these five terminal nodes, satisfying latency requirements between four pairs of nodes, (A, E), (A, B), (B, C) and (B, D) with $l_{A,E} \leq 450$ km, $l_{A,B} \geq 500$ km, $l_{B,C} \leq 500$ km and $l_{B,D} \leq 700$ km, respectively. After excluding topologies that clearly cannot satisfy the constraints, it is found that the topology shown in FIG. 8D provides a solution that satisfies the constraints and achieves the shortest length among solutions considered by the proposed algorithms. The performance of LAFM-II depends on the initial value. In this example, the values of λs are initialized as $\lambda_1=10$, $\lambda_2=10$, $\lambda_3=10$, $\lambda_4=10$ and are then updated according to Equation (9). LAFM-II stops when $\lambda_1=5.686$, $\lambda_2=0$, $\lambda_3=4.102$, $\lambda_4=1.068$, resulting in an approximate optimal solution ($G_{L,u}=0$) with total length 1682.75 km and total cost $10.18 million. The final result is shown in FIG. 16 and Table III, with three branching units located at (42.3677°N, 5.5849° E), (40.2236°N, 7.7463°E) and (39.3126°N, 7.8643°E). The length of the constraint path $l_{A,E}$, $l_{B,C}$ and $l_{B,D}$) are essentially equal to the requirements within the limits imposed by the resolution.

TABLE IV

Parameter setting of SA

| | |
|---|---|
| Initial temperature $T_0$ | 500 |
| Annealing temperature $T_k$ | $T(k) = \dfrac{T_0}{1 + \log(1 + k)}$ |
| Terminal temperature $T_f$ | 0 |

TABLE V

Results of SA under different latency constraints

| Latency requirement(s) | Total length (km) | Total cost (million $) | Constrained length (km) | Running time (s) |
|---|---|---|---|---|
| $l_{AE} \leq 500$ km | 1689.48 | 10.32 | $l_{AB} = 478.86$ | 74772 |
| $l_{AE} \leq 450$ km $l_{BC} \leq 510$ km | 1744.68 | 9.68 | $l_{AE} = 441.19$ $l_{BD} = 509.67$ | 69773 |
| $l_{AE} \leq 450$ km | 1798.07 | 10.70 | $l_{AE} = 442.21$ | 92113 |

TABLE III

The final SMT result with four constraints

| Topology | Requirements | Constrained length | $\lambda_s$ | BU number | total length | total cost (million $) | FIG. |
|---|---|---|---|---|---|---|---|
| Topology IV | $l_{A,E} \leq 450$ km $l_{A,B} \leq 500$ km $l_{B,C} \leq 500$ km $l_{B,D} \leq 700$ km | $l_{A,E} = 445.26$ km $l_{A,B} = 446.92$ km $l_{B,C} = 500.46$ km $l_{B,D} = 695.78$ km | $\lambda_1 = 5.686$ $\lambda_2 = 0$ $\lambda_3 = 4.102$ $\lambda_4 = 1.068$ | 3 | 1682.75 km | 10.18 | 16 |

Comparison with SA

For comparison, the SA algorithm is applied to design submarine communication cable paths under various latency requirements achieved by LAFM (LAFM-I, LAFM-II) described above. SA is a probabilistic technique for approximating the global optimum of a given function. Specifically, it provides an approximation to the global optimal in a large search space. For problems where finding an approximate global optimum is more important than finding a precise local optimum in a fixed amount of time, SA can be used to exact algorithms such as gradient descent or branch and bound. SA has been used to provide solutions in an extensive solution space and NP-hard combinatorial problems. In the context of cable path planning, SA has been used in X. Wang, Z. Wang, E. Tahchi, and M. Zukerman, "Submarine cable path planning based on weight selection of design considerations," *IEEE Access*, vol. 9, pp. 123 847-123 860, 2021 to obtain a cable path that is better than a real-world path designed manually by a cable expert. Since the problem of finding the optimal positions of several branching units in a huge discrete mesh network with billion(s) of nodes is an NP-hard problem, to shorten the time to obtain the solution, SA is applied to find the optimal solution and to compare with the results obtained by LAFM (LAFM-I, LAFM-II).

Table IV provides the parameter settings of SA in the comparison. Table V shows the solutions obtained by SA in the comparison, under one, two, and four constraints of the given topologies shown in FIG. 8D.

TABLE V-continued

Results of SA under different latency constraints

| Latency requirement(s) | Total length (km) | Total cost (million $) | Constrained length (km) | Running time (s) |
|---|---|---|---|---|
| $l_{AB} \leq 500$ km $l_{BC} \leq 500$ km $l_{BD} \leq 700$ km | | | $l_{AB} = 406.69$ $l_{BC} = 498.88$ $l_{BD} = 670.31$ | |

For SA, the total cost and length for the problem with one latency constraint are $10.32 million and 1689.48 km, respectively. Recall that the total cost and length obtained by LAFM-I are $9.61 million and 1670.37 km, respectively. As LAFM-I is optimal, SA cannot perform better than LAFM-I. For the example with two latency constraints, the total cost and the total length obtained by SA are $9.68 million and 1744.68 km, respectively, while LAFM-II found the optimal solution. For the case of four latency constraints, the total cost and length obtained by SA are $10.70 million and 1798.07 km, respectively, which are again worse than the optimal results obtained by LAFM-II.

The running times for SA are in the range 20-26 hours for each example, as shown in Table V. The running times of LAFM-I and LAFM-II depend on the initial value and update strategy of λs. For the examples mentioned above, the average running times for the LAFM method are in the range 4.5-6.5 hours, which are significantly shorter than the running times of SA.

Through the comparison of LAFM and SA both in terms of the quality of the results and the running times above, it can be seen that LAFM method generally outperforms SA method for submarine communication cable network optimization with latency constraint requirements.

The above embodiments of the invention has provided various advantages and unique features. In some embodiments, there is provided a new method (and related system) for addressing the problem of latency-aware optimization of a cable system with trunk-and-branch topology. Some embodiments of the invention can be considered as an improvement of the teachings in U.S. Ser. No. 16/265,337, granted as US10805207B2, which discloses system and method for determining an optimal path arrangement of an infrastructure link network, but does not consider latency constraint and hence cannot be used to address latency-aware optimization of a cable system with trunk-and-branch topology. Some embodiments have provided an optimization cable path planning solution for trunk-and-branch undersea cable networks, minimizing a depth and node-count dependent cost function subject to latency constraint(s) between one or more specified pairs of nodes. In some embodiments, the problem of minimizing the total construction cost of a cable system with trunk-and-branch topology as an SMT problem. Some embodiments also take account of latency constraint requirements between specified pairs of nodes. In some embodiments, there is provided a method, referred to as Lagrangian Fast Marching (LAFM) method, for solving the SMT problem over an irregular 2D manifold in a 3D space with constraints on the total length of each of the cables that connect a pair of nodes of a given set of pairs of nodes. In some embodiments, based on the LAFM method, there is provided various LAFM algorithms, including a LAFM-I algorithm for solving single constraint problems and a LAFM-II algorithm for solving multiple constraint problems. In some embodiments, the LAFM-I algorithm provides the optimal solution for a single constraint problem (for a given data resolution) and the LAFM-II provides algorithm a good quality feasible solution with provable bounds for problems involving multiple latency constraints. In some embodiments, LAFM-II can achieve optimal solutions with zero gap between the bounds. In some embodiments, LAFM-I or LAFM-II and the SA algorithms are applied in several realistic scenarios. In these scenarios the LAFM results (including LAFM-II results) are optimal so they can serve as a benchmark for the SA results. In some embodiments, SA has further potential benefits in cases where the gap between the LAFM-II bounds is large. Thus, in some embodiments, it may be useful to combine or selectively use LAFM-II and SA. LAFM can optimize trunk-and-branch tree topology cable system with latency constraints. This has been done for a network on the surface of the earth modeled by a triangulated manifold, taking into account the total cost of the cable system, which includes both actual cable and branching unit costs and a measure of location dependent risk. Specifically, some embodiments focus on minimizing the cost of the cable system while ensuring that cable length between some pairs of nodes satisfies latency requirements. Generally LAFM is based on FMM to find the optimal cable path between any pair of locations (mesh point) in the area and then determine the location of the Steiner nodes. The Steiner nodes in the problem can vary in number while incurring a penalty (cost), and their degrees may be constrained to three. It has been shown that LAFM can generally find the optimal solution for cable systems with one latency constraint and a feasible solution for cable systems with multiple latency constraints. In addition to this feasible solution that serves as an upper bound to the optimal cost solution, a lower bound for the optimal cost solution is also provided. It has been shown that LAFM-II can provide a solution with provable bounds for problems with multiple latency constraints. It has been demonstrated that optimal solutions (e.g., zero gap between the bounds) can be found, e.g., for examples with two and four latency constraints. The LAFM method is generally better than the SA method. In some cases when the result provide by LAFM-II is not optimal, the combination of LAFM-II and SA (e.g., by using the result of the LAFM-II to seed the SA algorithm) can provide further improvements. The skilled person appreciates that the various embodiments of the invention may have one or more advantages not specifically described herein.

Exemplary System

Figure 18:
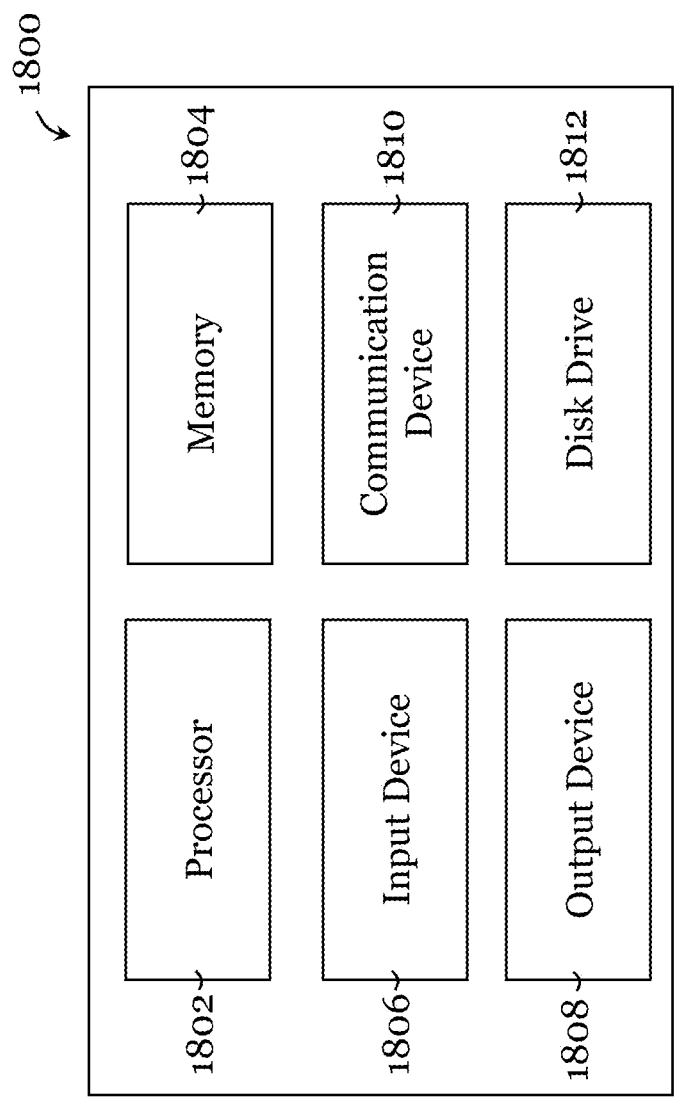
FIG. 18 is a function block diagram of a data processing system operable to implement at least part of the computer-implemented method of the invention.

FIG. 18 shows an exemplary data processing system 1800 that can be used to implement at least part of the computer-implemented method embodiments of the invention. The data processing system 1800 generally comprises suitable components necessary to receive, store, and execute appropriate computer instructions, commands, or codes. The main components of the data processing system 1800 are a processor 1802 and a memory (storage) 1804. The processor 1802 may include one or more of: CPU(s), MCU(s), controller(s), logic circuit(s), Raspberry Pi chip(s), digital signal processor(s) (DSP), application-specific integrated circuit(s) (ASIC), Field-Programmable Gate Array(s) (FPGA), or any other digital or analog circuitry/circuitries configured to interpret and/or to execute program instructions and/or to process signals and/or information and/or data. The memory 1804 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data, including instructions for implementing at least part of the computer-implemented method embodiments of the invention, may be stored in the memory 1804. Optionally, the data processing system 1800 further includes one or more input devices 1806. Examples of such input device 1806 include one or more of: keyboard, mouse, stylus, image scanner, microphone, tactile/touch input device (e.g., touch sensitive screen), image/video input device (e.g., camera), etc. The input device 1806 may be used to receive user input associated with the input to the models and/or algorithms of the invention. For example, the user input may include an input for the LAFM-I model, an input for the LAFM2 model, a selection of geographical locations (associated with the terrain), a selection of Steiner topology. Optionally, the data processing system 1800 further includes one or more output devices 1808. Examples of such output device 1808 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The display may display the determination result of the computer-implemented method embodiments of the invention. The data processing system 1800 may further include one or more disk drives 1812 which may encompass one or more of: solid state drive, hard disk drive, optical drive, flash drive, magnetic tape drive, etc. A suitable operating system may be installed in the data processing system 1800, e.g., on the disk drive 1812 or in the memory 1804. The memory 1804 and the disk drive 1812 may be operated by the processor 1802. Optionally, the data processing system 1800 also includes a communication device 1810 for establishing one or more communication links (not shown) with one or more other computing devices such as servers, personal computers, terminals, tablets, phones, watches, IoT devices, or other wireless or handheld computing devices. The communication device 1810 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1802, the memory 1804, and optionally the input device(s) 1806, the output device(s) 1808, the communication device 1810 and the disk drives 1812 are connected with each other through a branching units, a Peripheral Component Interconnect (PCI) such as PCI Express, a Universal Serial Branching units (USB), an optical branching units, or other like branching units structure. In one embodiment, some of these components may be connected through a network such as the Internet or a cloud computing network. A person skilled in the art would appreciate that the data processing system 1800 shown in FIG. 18 is merely exemplary and that the data processing system in other embodiments can have different configurations (e.g., with additional components, fewer components, different components, etc.). The information handling system 1800 may be a dedicated information handling system or a non-dedicated information handling system.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive.

For example, while the above-described embodiments focus on submarine communication cable networks, the invention could be alternatively or additionally applied to other infrastructure link networks such as but not limited to a cable (communication, power, optical, electric, etc.) network, a pipe/pipeline (for transporting fluid or solids (e.g., oil, fuel, water, sewage)) network, a public transport (railway, road, tunnel, bridge, etc.) network, etc., which may be arranged underground, above ground, submarine, subsea, or any of their combination. In some embodiments, the invention includes determining a path arrangement of an infrastructure link network with a trunk-and-branch topology, then building the infrastructure link network in accordance with the determined path arrangement.

The invention claimed is:

1. A computer-implemented method for determining a path arrangement of an infrastructure link network with a trunk-and-branch topology, comprising:
    modelling a geographic terrain including three or more geographic locations that are connectable with each other via an infrastructure link network;
    determining a cost function associated with a cost for constructing the infrastructure link network that connects the three or more geographic locations; and
    determining a path arrangement of the infrastructure link network based on the modelled geographic terrain and by optimizing the cost function taking into account one or more constraints,
    the path arrangement of the infrastructure link network having a trunk-and-branch topology and including: three or more infrastructure links that connect the three or more geographic locations, and one or more connection points each arranged between two or more of the infrastructure links.

2. The computer-implemented method of claim 1, wherein the one or more constraints comprise a maximum path length between two of the geographic locations, the maximum path length being defined by one or more of the infrastructure links.

3. The computer-implemented method of claim 1, wherein optimizing the cost function taking into account one or more constraints comprises minimizing the cost function taking into account one or more constraints.

4. The computer-implemented method of claim 1, wherein the modelling of the geographic terrain comprises modelling the geographic terrain as an irregular two-dimensional (2D) manifold in three-dimensional (3D) Euclidean space.

5. The computer-implemented method of claim 1, wherein the cost function is a depth dependent cost function.

6. The computer-implemented method of claim 1, wherein the cost for constructing the infrastructure link network comprises costs associated with laying and/or constructing (i) the infrastructure links and (ii) one or more connector units each connecting two or more of the infrastructure links, wherein each of the one or more connector units is arranged or to be arranged at a respective one of the one or more connection points.

7. The computer-implemented method of claim 1, wherein the determining of the path arrangement of the infrastructure link network comprises determining a total number of and/or respective positions of the one or more connection points.

8. The computer-implemented method of claim 1, wherein the determination of the path arrangement of the infrastructure link network comprises:
    formulating the determination of the path arrangement of the infrastructure link network as a Steiner Minimal Tree problem taking into account the one or more constraints; and
    solving the Steiner Minimal Tree problem taking into account the one or more constraints;
    wherein the trunk-and-branch topology of the path arrangement of the infrastructure link network generally corresponds to a Steiner topology.

9. The computer-implemented method of claim 8, wherein the formulating comprises formulating the Steiner Minimal Tree problem as a constrained Steiner Minimal Tree problem that can be represented by:

$$\min_{S \in H, \Gamma} F(S) = f(S) + c_b \cdot N_b$$

$$\text{s.t. } d_k(x_i, x_j) \le b_k(x_i, x_j), k = 1, \ldots, |R|$$

where H is a set of mesh points in the modelled geographic terrain; Γ is a set of geodesic curves of the Steiner tree; R is a set of one or more constraints; $S=\{s_1, s_2, \ldots, s_{N_1}\}$ is a set of positions of one or more Steiner nodes in the modelled geographic terrain; f(S) is an infrastructure link laying cost of the infrastructure link network, which is dependent on the positions of the one or more Steiner nodes S and the geodesic curves Γ; $N_b$ is the number of Steiner nodes; $C_b$ is the cost of each connector unit; $x_i$ and $x_j$ are any pair(s) of terminal nodes subjected to constrain factor(s), each of the terminal nodes corresponding to a respective one of the geographic locations; $b(x_i, x_j)$ is a value of the constraint; and $d_k(x_i, x_j)$ is a path length defined by one or more infrastructure links between nodes, $x_i$ and $x_j$.

10. The computer-implemented method of claim 9, wherein the solving comprises:
converting the constrained Steiner Minimal Tree problem into an unconstrained problem based on a Lagrange multiplier based method; and
determining a solution for the unconstrained problem to obtain respective optimal position of one or more Steiner nodes, each of the one or more Steiner nodes corresponding to a respective one of the one or more connection points.

11. The computer-implemented method of claim 10, wherein the Lagrange multiplier based method applies a Lagrangian function that can be represented as:

$$L(S, \lambda) = f(S) + \sum_{k=1}^{|R|} \lambda_k (g_k(S) - b_k(x_i, x_j)) + c_b \cdot N_b$$

where L(S,λ) is a Lagrangian function of s and λ; $\lambda=[\lambda_1, \lambda_2, \ldots, \lambda_{|R|}]^T$ is the vector of Lagrange multipliers, $\lambda_k \le 0$; f(S) represents the infrastructure link laying cost of the infrastructure link network; $g_k(S)$ denotes $d_k$ which is determined by the position of Steiner node(s) on a path of one or more infrastructure links between constrained nodes $x_i$ and $x_j$.

12. The computer-implemented method of claim 11, wherein the determining of the solution comprises:
applying fast marching method to each of the terminal nodes to obtain corresponding distance maps; and
processing the distance maps and a predetermined Steiner tree topology based on a directed acyclic graph based dynamic programming algorithm to obtain respective coordinate of the one or more Steiner nodes.

13. The computer-implemented method of claim 12, wherein the one or more constraints consist of a single constraint associated with a maximum path length between two of the geographic locations, the maximum path length being defined by one or more of the infrastructure links.

14. The computer-implemented method of claim 13, wherein the determining of the solution further comprises:
updating the distance maps based on a value of λ associated with the single constraint; and
processing the updated distance maps and the predetermined Steiner tree topology based on the directed acyclic graph based dynamic programming algorithm to obtain further respective coordinate of the one or more Steiner nodes.

15. The computer-implemented method of claim 14, wherein the determining of the solution further comprises:
(1) updating the value of λ based on a primal-dual subgradient method;
(2) updating the distance maps based on the updated value of λ; and
(3) processing the updated distance maps and the predetermined Steiner tree topology based on the directed acyclic graph based dynamic programming algorithm to obtain updated coordinates of one or more Steiner nodes.

16. The computer-implemented method of claim 15, wherein the determining of the solution further comprises:
iteratively repeating steps (1) to (3) until or after a limit of the constraint is reached, until or after a threshold associated with a limit of the constraint is reached, or until or after a predetermined number of iterations is completed, so as to obtain respective optimal position of the one or more Steiner nodes.

17. The computer-implemented method of claim 12, wherein the one or more constraints comprise a plurality of constraints associated with a corresponding plurality of maximum path lengths each between respective two of the geographic locations, each of the maximum path lengths being defined by one or more of the infrastructure links.

18. The computer-implemented method of claim 17, wherein the determining of the solution further comprises:
updating the distance maps based on values of two or more λs each associated with a respective one of the constrains; and
processing the updated distance maps and the predetermined Steiner tree topology based on the directed acyclic graph based dynamic programming algorithm to obtain further respective coordinate of the one or more Steiner nodes.

19. The computer-implemented method of claim 18, wherein the determining of the solution further comprises:
(1) updating all of the values of λs based on a primal-dual subgradient method;
(2) updating the distance maps based on the updated values of λs; and
(3) processing the updated distance maps and the predetermined Steiner tree topology based on the directed acyclic graph based dynamic programming algorithm to obtain updated coordinates of one or more Steiner nodes.

20. The computer-implemented method of claim 19, wherein the determining of the solution further comprises:
iteratively repeating steps (1) to (3) until or after respective limits of one or more of the constraints is reached, until or after respective thresholds associated with respective limits of one or more of the constraints is reached, or until or after a predetermined number of iterations is completed, so as to obtain respective optimal position of the one or more Steiner nodes.

21. The computer-implemented method of claim 1, wherein the infrastructure link network comprises a submarine communication cable network.

22. The computer-implemented method of claim 21, wherein the cost for constructing the submarine communication cable network comprises cost associated with laying and/or constructing (i) the communications cables and (ii)

one or more branching units for connecting with at least two of the communications cables, wherein each of the one or more branching units is arranged at a respective one of the one or more connection points.

23. A non-transitory computer readable medium comprising computer instructions which, when executed by one or more processors, cause the one or more processors to carry out the method of claim 1.

24. A system for determining a path arrangement of an infrastructure link network with a trunk-and-branch topology, comprising one or more processors arranged to:
- model a geographic terrain including three or more geographic locations that are connectable with each other via an infrastructure link network;
- determine a cost function associated with a cost for constructing the infrastructure link network that connects the three or more geographic locations; and
- determine a path arrangement of the infrastructure link network based on the modelled geographic terrain and by optimizing the cost function taking into account one or more constraints, the path arrangement of the infrastructure link network having a trunk-and-branch topology and including: three or more infrastructure links that connect the three or more geographic locations, and one or more connection points each arranged between two or more of the infrastructure links.

* * * * *